United States Patent
Gupta et al.

(10) Patent No.: US 9,031,563 B2
(45) Date of Patent: May 12, 2015

(54) ENHANCED INTER-RAT MOBILITY SUPPORT USING INTER-RAT CHANNEL AVOIDANCE

(71) Applicant: QUALCOMM Incorporated, San Diego, CA (US)

(72) Inventors: Sudhendra K. Gupta, San Diego, CA (US); Bhavan A. Shah, San Diego, CA (US); Nam Soo Park, San Diego, CA (US); Arvind Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/860,688

(22) Filed: Apr. 11, 2013

(65) Prior Publication Data

US 2013/0273916 A1 Oct. 17, 2013

Related U.S. Application Data

(60) Provisional application No. 61/623,543, filed on Apr. 12, 2012.

(51) Int. Cl.
| | | |
|---|---|---|
| *H04W 36/34* | (2009.01) | |
| *H04W 36/00* | (2009.01) | |
| *H04W 36/14* | (2009.01) | |
| *H04W 88/06* | (2009.01) | |

(52) U.S. Cl.
CPC .......... *H04W 36/34* (2013.01); *H04W 36/0094* (2013.01); *H04W 36/14* (2013.01); *H04W 88/06* (2013.01)

(58) Field of Classification Search
CPC . H04W 36/14; H04W 36/0094; H04W 36/34; H04W 88/06

USPC ................... 455/436, 442; 370/217, 218, 352
See application file for complete search history.

(56) References Cited

U.S. PATENT DOCUMENTS

| | | |
|---|---|---|
| 2011/0242969 A1 | 10/2011 | Dayal et al. |
| 2011/0269453 A1 | 11/2011 | Ranta-Aho et al. |

(Continued)

FOREIGN PATENT DOCUMENTS

| | | |
|---|---|---|
| EP | 2247142 A1 | 11/2010 |
| WO | WO-2012097502 A1 | 7/2012 |

OTHER PUBLICATIONS

ISA/EPA, International Search Report and Written Opinion, Oct. 25, 2013, 7pgs., Int'l Appl. No. PCT/US2013/036275, European Patent Office, Rijswijk, NL.

*Primary Examiner* — Sam Bhattacharya
(74) *Attorney, Agent, or Firm* — Holland & Hart LLP

(57) ABSTRACT

Methods, systems, and devices are described for improving inter-network mobility performance in multiple network wireless communication systems by using channel avoidance information from a first network using a first radio access technology (RAT) to modify inter-RAT behavior of a second network using a second RAT. In some embodiments, the second network queries the first network for channel avoidance information and applies the channel avoidance information in suppressing inter-RAT channel measurements, avoiding inter-RAT redirection, and/or avoiding inter-RAT reselection. In embodiments, inter-RAT channel measurement suppression, inter-RAT redirection avoidance, and/or inter-RAT reselection avoidance is performed by the mobile device. In other embodiments, channel avoidance information of the first network may be communicated to other network entities of the second network and one or more of these entities may modify various inter-RAT behaviors.

50 Claims, 13 Drawing Sheets

(56) References Cited

U.S. PATENT DOCUMENTS

| | | |
|---|---|---|
| 2012/0088455 A1 | 4/2012 | Love et al. |
| 2012/0163307 A1 | 6/2012 | Wang et al. |
| 2013/0029704 A1 | 1/2013 | Koo et al. |
| 2013/0155902 A1* | 6/2013 | Feng et al. .......... 370/255 |

* cited by examiner

ENHANCED INTER-RAT MOBILITY SUPPORT USING INTER-RAT CHANNEL AVOIDANCE

CROSS REFERENCES

The present application for patent claims priority benefit to co-pending U.S. Provisional Patent Application No. 61/623,543, entitled "Enhanced Inter-RAT Mobility Support Using Inter-RAT Channel Avoidance" by Gupta et al., filed Apr. 12, 2012, assigned to the assignee hereof, and expressly incorporated by reference herein for all purposes.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Multiple-access wireless communication systems may include multiple geographically overlapping networks employing multiple radio access technologies (RATs).

Generally, a wireless multiple-access communication system can simultaneously support communication for multiple mobile devices. Mobile devices may, in some examples, be called access terminals, user equipments (UEs), mobile stations, and the like. Each mobile device communicates with one or more base stations or access nodes via transmissions on forward and reverse links. The forward link refers to the communication link from the base stations to the mobile devices, and the reverse link refers to the communication link from the mobile devices to the base stations.

Due to data traffic, channel characteristics, or mobility of mobile devices, a need frequently arises for a particular mobile device to transition between different access nodes and/or networks. This process is complicated by the various states that a mobile device can be in for battery savings or channel efficiency (e.g., idle, active, discontinuous reception/transmission). This process is also complicated by the presence of different RATs. For example, different RATs may employ different techniques for determining acceptable access nodes and/or frequencies for handover. Accordingly, improving inter-RAT mobility performance may be useful in improving mobile device and/or network performance such as data transfer integrity and mobile device power consumption.

SUMMARY

Methods, systems, and devices are described for using channel avoidance information for a first network in a second network. In some embodiments, the second network queries the first network for channel avoidance information and applies the channel avoidance information in suppressing inter-RAT channel measurements, avoiding inter-RAT redirection, and/or avoiding inter-RAT reselection. In various embodiments, suppression of channel measurements, inter-RAT redirection avoidance, and/or inter-RAT reselection avoidance is performed by the mobile device. For example, a first modem of a mobile device may determine channel avoidance information for the first network. A second modem of the mobile device associated with the second network may query the first modem for the channel avoidance information for the first network. The second modem may use the channel avoidance information associated with the first network and modify channel measurement, inter-RAT reselection, and/or inter-RAT redirection behavior based on the channel avoidance information. In embodiments, channel avoidance information of the first network may be communicated to other network entities of the second network and the second network may suppress inter-RAT channel measurements, inter-RAT reselection and/or inter-RAT redirection.

Some embodiments are directed to a wireless communications device including a first modem supporting wireless communications using a first RAT and a second modem supporting wireless communication using a second RAT. The first modem includes an access failure identification module that may identify frequency channels as temporarily unavailable for communication using the first RAT and a channel avoidance module configured to determine avoidance information for the first RAT associated with the identified frequency channels. The second modem includes an inter-RAT channel avoidance module configured to, while the wireless communications device is in communication with a network entity using the second RAT, modify an inter-RAT mobility behavior associated with the frequency channel based at least in part on the avoidance information determined for the first RAT. The inter-RAT channel avoidance module of the second modem may be communicatively coupled with the channel avoidance module of the first modem. The first modem may have a first protocol stack and the second modem may have a second protocol stack, and the coupling between modems may include communication between the first and second protocol stacks.

The temporarily unavailable frequency channels may be identified based on access failures associated with attempted communication between the first modem and a network entity associated with the first RAT over the frequency channels. Access failures may include, for example, failure due to network loading, observing a threshold number of traffic channel assignment (TCA) timeouts, network authentication failure, point-to-point protocol failure, session negotiation failure, or a maximum access probe failure condition. In some embodiments, a channel identified as temporarily unavailable for communication may be a reverse link frequency channel, and the inter-RAT channel avoidance module may be configured to suppress reporting of measurement information of an associated forward link frequency channel based at least in part on the avoidance information determined for the first RAT.

In some embodiments, the second modem includes an inter-RAT reselection module configured to avoid inter-RAT reselection to the identified frequency channel based at least in part on the avoidance information determined for the first RAT. The second modem may include an inter-RAT redirection module configured to receive inter-RAT redirection requests from the network entity indicating an inter-RAT handover to a network entity associated with the first RAT at the identified frequency channel, and to avoid the inter-RAT handover based at least in part on the avoidance information determined for the first RAT.

In some embodiments, the channel avoidance module of the first modem is further configured to associate a channel avoidance time period with the identified frequency channel for the first RAT. The inter-RAT channel avoidance module may be configured to identify an inter-RAT channel avoidance time period associated with the identified frequency channel based at least in part on a remaining time of the channel avoidance time period determined for the first RAT.

In embodiments, the first RAT is a CDMA 1x/DO system and the second RAT is an Evolved Universal Terrestrial Radio Access Network (E-UTRAN) system.

Some embodiments are directed to a wireless communications system including a channel access failure identification module configured to receive avoidance information for a first RAT at a network entity of a second RAT, the avoidance information including an avoided frequency channel for a mobile device. and an inter-RAT channel avoidance module configured to, while communicating with the mobile device using the second RAT, modify an inter-RAT mobility behavior for the mobile device based at least in part on the avoidance information for the first RAT. The inter-RAT channel avoidance module may be further configured to modify, by the network entity of the second RAT, measurement control information transmitted to the mobile device to suppress channel measurement of the avoided frequency channel by the mobile device based at least in part on the avoidance information determined for the first RAT.

Some embodiments are directed to a method including identifying, at mobile device, a frequency channel as temporarily unavailable for communication using a first RAT, determining avoidance information for the first RAT associated with the identified frequency channel, and modifying, while the mobile device is in communication with a network entity over a second RAT, an inter-RAT mobility behavior associated with the identified frequency channel based at least in part on the avoidance information determined for the first RAT.

In some embodiments, the frequency channel is identified as temporarily unavailable for communication based on an access failure associated with attempted communication between the mobile device and a network entity associated with the first RAT over the frequency channel. The access failure may be, for example, failure due to network loading, observing a threshold number of traffic channel assignment (TCA) timeouts, network authentication failure, point-to-point protocol failure, session negotiation failure, or a maximum access probe failure condition. In some embodiments, the identified frequency channel is a reverse link frequency channel, and modifying the inter-RAT mobility behavior includes suppressing reporting of measurement information of an associated forward link frequency channel based at least in part on the avoidance information determined for the first RAT.

In some embodiments, the method includes receiving an inter-RAT redirection request from the network entity indicating an inter-RAT handover between the second RAT and the first RAT at the identified frequency channel, and avoiding the inter-RAT handover based at least in part on the avoidance information determined for the first RAT. The method may include identifying conditions for inter-RAT reselection to the first RAT at the identified frequency channel, and avoiding the inter-RAT reselection based at least in part on the avoidance information determined for the first RAT.

In some embodiments, the method includes identifying an inter-RAT channel avoidance time period associated with the identified frequency channel based at least in part on a remaining time of a channel avoidance time period associated with the identified frequency channel for the first RAT. In embodiments, the first RAT is a CDMA 1x/DO system and the second RAT is an Evolved Universal Terrestrial Radio Access Network (E-UTRAN) system.

Some embodiments are directed to a method including receiving avoidance information for a first RAT at a network entity of a second RAT, where the avoidance information includes an avoided frequency channel for a mobile device, communicating with the mobile device using the second RAT, and modifying an inter-RAT mobility behavior for the mobile device based at least in part on the avoidance information for the first RAT. Modifying the inter-RAT mobility behavior may include modifying, by the network entity of the second RAT, measurement control information transmitted to the mobile device to suppress channel measurement of the avoided frequency channel by the mobile device based at least in part on the avoidance information determined for the first RAT.

Some embodiments are directed to a wireless communications system including means for identifying, at a mobile device, a frequency channel as temporarily unavailable for communication using a first radio access technology (RAT), means for determining avoidance information for the first RAT associated with the identified frequency channel, and means for modifying, while the mobile device is in communication with a network entity over a second RAT, an inter-RAT mobility behavior associated with the frequency channel based at least in part on the avoidance information determined for the first RAT. In embodiments, the first RAT is a CDMA 1x/DO system and the second RAT is an Evolved Universal Terrestrial Radio Access Network (E-UTRAN) system.

The means for identifying the frequency channel as temporarily unavailable may include means for identifying the frequency channel as temporarily unavailable for communication based on an access failure associated with attempted communication between the mobile device and a network entity associated with the first RAT over the frequency channel. Access failures may include, for example, failure due to network loading, observing a threshold number of traffic channel assignment (TCA) timeouts, network authentication failure, point-to-point protocol failure, session negotiation failure, or a maximum access probe failure condition. In some embodiments, a channel identified as temporarily unavailable for communication may be a reverse link frequency channel, and the means for modifying the inter-RAT mobility behavior includes means for suppressing reporting of measurement information of a forward link frequency channel of the traffic channel based at least in part on the avoidance information determined for the first RAT.

In some embodiments, the wireless communications system includes means for receiving an inter-RAT redirection request from the network entity indicating an inter-RAT handover between the second RAT and the first RAT at the identified frequency channel, and means for avoiding the inter-RAT handover based at least in part on the avoidance information determined for the first RAT. In some embodiments, the wireless communications system includes means for identifying conditions for inter-RAT reselection to the first RAT at the identified frequency channel, and means for avoiding the inter-RAT reselection based at least in part on the avoidance information determined for the first RAT. The wireless communications system may include means for identifying an inter-RAT channel avoidance time period associated with the identified frequency based at least in part on a remaining time of a channel avoidance time period associated with the identified frequency channel for the first RAT.

Some embodiments are directed to a wireless communications system including means for receiving avoidance information for a first radio access technology (RAT) at a network entity of a second RAT, the avoidance information comprising an avoided frequency channel for a mobile device, means for communicating with the mobile device using the second RAT, and means for modifying an inter-RAT mobility behavior for the mobile device based at least in part on the avoidance information for the first RAT. The means for modifying the inter-RAT mobility behavior may include means for modifying, by the network entity of the second RAT, measurement control information transmitted to the mobile device to suppress channel measurement of the avoided frequency channel by the mobile device based at least in part on the avoidance information determined for the first RAT.

Some embodiments are directed to a computer program product for a wireless communications system including a non-transitory computer-readable medium including code for causing a computer to identify, at a mobile device, a frequency channel as temporarily unavailable for communication using a first RAT, code for causing the computer to determine avoidance information for the first RAT associated with the identified frequency channel, and code for causing the computer to modify, while the mobile device is in communication with a network entity over a second RAT, an inter-RAT mobility behavior associated with the frequency channel based at least in part on the avoidance information determined for the first RAT.

In some embodiments, the non-transitory computer-readable medium includes code for causing the computer to identify the frequency channel as temporarily unavailable for communication based on an access failure associated with attempted communication between the mobile and a network entity associated with the first RAT over the frequency channel. Access failures may include, for example, failure due to network loading, observing a threshold number of traffic channel assignment timeouts, network authentication failure, point-to-point protocol failure, session negotiation failure, or a maximum access probe failure condition. In some embodiments, a channel identified as temporarily unavailable for communication may be a reverse link frequency channel, and the non-transitory computer-readable medium includes code for causing the computer to suppress reporting of measurement information of a forward link frequency channel of the traffic channel based at least in part on the avoidance information determined for the first RAT.

In some embodiments, the non-transitory computer-readable medium includes code for causing the computer to avoid inter-RAT reselection to the identified frequency channel based at least in part on the avoidance information determined for the first RAT. In some embodiments, the non-transitory computer-readable medium includes code for causing the computer to receive inter-RAT redirection requests from the network entity indicating an inter-RAT handover to the first RAT at the identified frequency channel, and code for causing the computer to avoid the inter-RAT handover based at least in part on the avoidance information determined for the first RAT. In some embodiments, the non-transitory computer-readable medium includes code for causing the computer to identify an inter-RAT channel avoidance time period associated with the identified frequency based at least in part on a remaining time of a channel avoidance time period associated with the identified frequency channel for the first RAT.

Some embodiments are directed to a computer program product for a wireless communications system including a non-transitory computer-readable medium including code for causing a computer to receive avoidance information for a first RAT at a network entity of a second RAT, the avoidance information comprising an avoided frequency channel for a mobile device, code for causing the computer to communicate with the mobile device using the second RAT, and code for causing the computer to modify an inter-RAT mobility behavior for the mobile device based at least in part on the avoidance information for the first RAT. The non-transitory computer-readable medium further may include code for causing the compute to modify, by the network entity of the second RAT, measurement control information transmitted to the mobile device to suppress channel measurement of the avoided frequency channel by the mobile device based at least in part on the avoidance information determined for the first RAT.

Some embodiments are directed to a wireless communications device configured for multi-mode access in a multiple network wireless communications system. The wireless communications device may include at least one processor configured to identify, at a mobile device, a frequency channel as temporarily unavailable for communication using a first RAT, determine avoidance information for the first RAT associated with the identified frequency channel, and modify, while the mobile device is in communication with a network entity over a second RAT, an inter-RAT mobility behavior associated with the frequency channel based at least in part on the avoidance information determined for the first RAT. The wireless communications device may include a memory coupled to the at least one processor.

In some embodiments, the at least one processor is further configured to identify the frequency channel as temporarily unavailable for communication based on an access failure associated with attempted communication between the mobile device and a network entity associated with the first RAT over the frequency channel. Access failures may include, for example, failure due to network loading, observing a threshold number of traffic channel assignment timeouts, network authentication failure, point-to-point protocol failure, session negotiation failure, or a maximum access probe failure condition. The identified frequency channel may be a reverse link frequency channel of a traffic channel, and the at least one processor may be further configured to suppress reporting of measurement information of a forward link frequency channel of the traffic channel based at least in part on the avoidance information determined for the first RAT.

In some embodiments, the at least one processor is further configured to receive an inter-RAT redirection request from the network entity indicating an inter-RAT handover between the second RAT and the first RAT at the identified frequency channel, and avoid the inter-RAT handover based at least in part on the avoidance information determined for the first RAT. In some embodiments, the at least one processor is further configured to identify conditions for inter-RAT reselection to the first RAT at the identified frequency channel, and avoid inter-RAT reselection to the first RAT at the identified frequency channel based at least in part on the avoidance information determined for the first RAT. In some embodiments, the at least one processor is further configured to identify an inter-RAT channel avoidance time period associated with the identified frequency based at least in part on a remaining time of a channel avoidance time period associated with the identified frequency channel for the first RAT.

Some embodiments are directed to a wireless communications system including at least one processor configured to receive avoidance information for a first RAT at a network entity of a second RAT, the avoidance information comprising an avoided frequency channel for a mobile device, communicate with the mobile device using the second RAT, and modify an inter-RAT mobility behavior for the mobile device based at least in part on the avoidance information for the first RAT. The wireless communications system may include a memory coupled to the at least one processor. The at least one processor may be configured to modify, by the network entity of the second RAT, measurement control information transmitted to the mobile device to suppress channel measurement of the avoided frequency channel by the mobile device based at least in part on the avoidance information determined for the first RAT.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
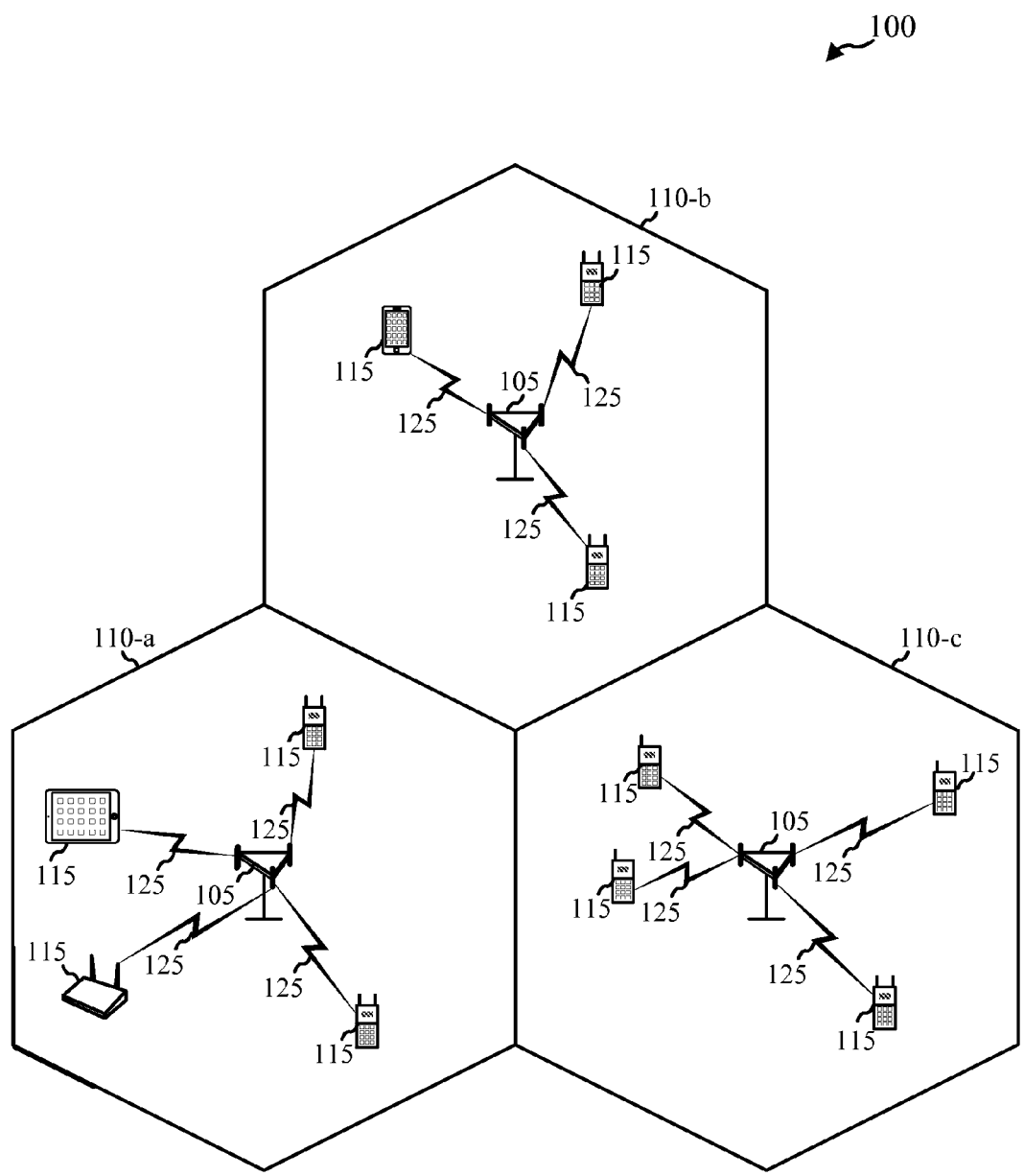
FIG. 1 is a block diagram that illustrates an example of a wireless communications system in accordance with various embodiments.
Figure 1:
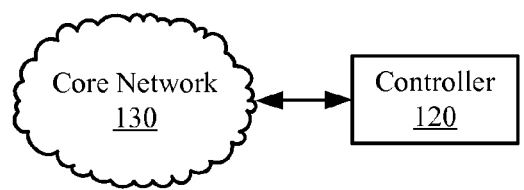

Methods, systems, and devices are provided for using channel avoidance information from a first network in a second network. In some embodiments, the second network queries the first network for channel avoidance information and applies the channel avoidance information in suppressing inter-RAT channel measurements, avoiding inter-RAT redirection, and/or avoiding inter-RAT reselection. In embodiments, suppression of inter-RAT channel measurements, avoiding inter-RAT redirection, and/or avoiding inter-RAT reselection is performed by the mobile device. For example, a first modem of a mobile device may determine channel avoidance information for the first network. A second modem of the mobile device associated with the second network may query the first modem for the channel avoidance information for the first network. The second modem may use the channel avoidance information associated with the first network and modify channel measurement, inter-RAT reselection, and/or inter-RAT redirection behavior based on the channel avoidance information. In embodiments, channel avoidance information of the first network may be communicated to other network entities of the second network and the second network may suppress inter-RAT channel measurements, inter-RAT reselection and/or inter-RAT redirection.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Referring first to FIG. 1, a block diagram illustrates an example of a wireless communications system 100 in accordance with various embodiments. The system 100 includes base stations 105, mobile devices 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc.

The mobile devices 115 may be any type of mobile station, mobile device, access terminal, subscriber unit, and/or user equipment. The mobile devices 115 may include cellular phones and wireless communications devices, but may also include personal digital assistants (PDAs), smartphones, other handheld devices, tablets, netbooks, notebook computers, etc. Thus, the term mobile device should be interpreted broadly hereinafter, including the claims, to include any type of wireless or mobile communications device.

The base stations 105 may wirelessly communicate with the mobile devices 115 via one or more base station antennas. System 100, for example, shows transmissions 125 between mobile devices 115 and base stations 105. The transmissions 125 may include forward link (FL) transmissions from a base station 105 to a mobile device 115, and/or reverse link (RL) transmission from a mobile device 115 to a base station 105. Forward link transmissions may also be called downlink transmissions while reverse link transmissions may also be called uplink transmissions. The base stations 105 may be configured to communicate with the mobile devices 115 under the control of the controller 120 via multiple carriers. Each of the base station 105 sites can provide communication coverage for a respective geographic area or "cell." In some instances, the term "cell" may refer to a base station 105 and/or the coverage area for the base station 105. In some embodiments, base stations 105 may be referred to as a NodeB, eNodeB, Home NodeB, and/or Home eNodeB. The coverage area for each base station 105 here is identified as coverage area 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations). Base stations 105 may each be capable of supporting multiple networks using different radio access technologies (e.g., GERAN, UTRAN, E-UTRAN, CDMA, etc.).

In some embodiments, the different aspects of system 100, such as the mobile devices 115, the base stations 105, the core network 130, and/or the controller 120 may be configured for improving inter-RAT mobility performance using aspects of inter-RAT measurement suppression, inter-RAT reselection avoidance, and/or inter-RAT redirection avoidance described in more detail below. In some embodiments, channel avoidance information may be determined for a first network employing a first RAT. A second network employing a second RAT may utilize portions of the channel avoidance information for the first RAT to improve inter-RAT mobility performance. For example, the second network may use the channel avoidance information for suppressing inter-RAT channel measurements, avoiding inter-RAT redirection, and/or avoiding inter-RAT reselection. In embodiments, suppression of inter-RAT channel measurements, avoidance of inter-RAT redirection, and/or avoidance of inter-RAT reselection is performed by the mobile device. For example, a first modem of a mobile device may determine channel avoidance information for the first network. A second modem of the mobile device associated with the second network may query the first modem for the channel avoidance information for the first network. The second modem may utilize the channel avoidance information for the first network and to modify inter-RAT channel measurement, inter-RAT reselection, and/or inter-RAT redirection behavior based on the channel avoidance information. In other embodiments, channel avoidance information of the first network may be communicated to other network entities of the second network and the second network may suppress inter-RAT channel measurements, avoid inter-RAT reselection, and/or avoid inter-RAT redirection.

Figure 2:
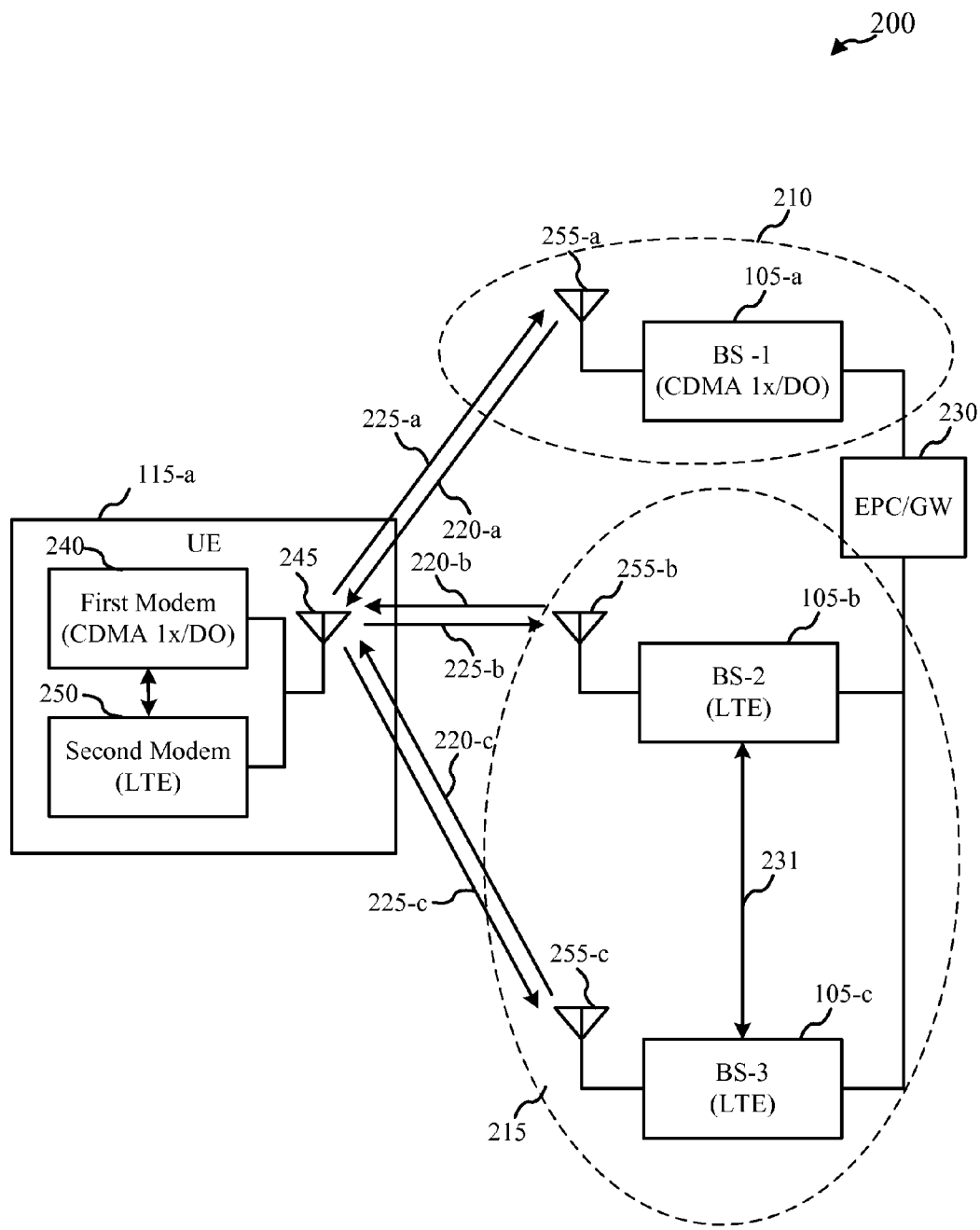
FIG. 2 is a block diagram that illustrates an example of a wireless communications system in accordance with various embodiments.

FIG. 2 illustrates a multiple network wireless communications system 200 in accordance with various embodiments. Wireless communications system 200 may include a first network 210 that uses a first RAT and a second network 215 that uses a second, different RAT. For example, the first network 210 may be a CDMA system such as a system utilizing a CDMA 1x/DO air interface while the second network 215 may be a 3GPP Long Term Evolution (LTE) and/or LTE-Advanced (LTE-A) system. The first network 210 may include base station 105-a and/or other base stations. The second network 215 may include base stations 105-b, 105-c, and/or other base stations. Base stations 105-a, 105-b, and/or 105-c may each have one or more antennas 255 (e.g., 255-a, 255-b, 255-c, etc.) for communication with other network entities (e.g., other base stations, mobile devices, etc.). The first network 210 and the second network 215 may have overlapping coverage areas. Base stations 105 may communicate with other base stations through direct wired and/or wireless communication links 231 (e.g., S1, X2, etc.) and/or through a core network 230 (e.g., EPC, etc.).

Mobile device 115-a may be a multi-mode mobile device with a first modem 240 that can communicate with the first network 210 using the first RAT and a second modem 250 that can communicate with the second network 215 using the second RAT. Mobile device 115-a may have one or more antenna(s) 245 for communication using the first RAT and/or second RAT. Because the coverage areas of base stations 105-a, 105-b, and/or 105-c may overlap, it may be possible for mobile device 115-*a* to communicate with one or more of base stations 105-*a*, 105-*b*, and/or 105-*c* at any given time. For example, in its current location, mobile device 115-*a* may be able to receive information from base station 105-*a* over FL transmission 220-*a* and transmit information to base station 105-*a* over RL transmission 225-*a*. Mobile device 115-*a* may also be able to receive information from base stations 105-*b* and/or 105-*c* over FL transmissions 220-*b* and 220-*c*, respectively, and transmit information to base stations 105-*b* and/or 105-*c* over RL transmissions 225-*b* and/or 225-*c*, respectively.

FL and RL channels may be paired (e.g., in frequency division duplex (FDD) systems, etc.) and channel conditions for the paired FL and RL channels may be asymmetric. For example, mobile device 115-*a* may be able to receive FL transmissions 220-*a* over a particular FL frequency channel from base station 105-*a* while channel conditions for an associated RL frequency channel are degraded such that base station 105-*a* may not receive RL transmission 225-*a*. In these instances, mobile device 115-*a* may attempt to access base station 105-*a* based on the observed channel conditions for the FL frequency channel. This access attempt may be unsuccessful (e.g., maximum access probe condition, etc.) because of the poor conditions on the RL frequency channel.

Typically, mobile device 115-*a* may actively communicate with only one network at a time. Selection of a source base station and/or radio access technology for wireless communication service may depend on various factors including transmission channel conditions, proximity of mobile device 115-*a* to base stations 105-*a*, 105-*b*, and/or 105-*c*, bandwidth availability of base stations 105-*a*, 105-*b*, and/or 105-*c*, user operation of mobile device 115-*a* (e.g., data, voice, etc.), and/or other factors.

Mobile device 115-*a* may dynamically switch wireless communications service between base stations 105 and/or networks. Multi-mode mobile devices may support various features for inter-RAT mobility. For example, mobile device 115-*a* may support inter-RAT reselection and/or inter-RAT redirection. Inter-RAT reselection and/or inter-RAT redirection includes reselection and/or redirection from a source base station and source RAT to the same source base station (or a co-located base station) using a different target RAT and/or reselection and/or redirection from a source base station and source RAT to a different target base station using a different target RAT.

Different networks may utilize different mechanisms related to selecting, establishing, and/or maintaining communication links. In some embodiments, the first RAT may support channel avoidance features for limiting reselection and/or redirection to frequency channels for which it has recently experienced problems in establishing and/or maintaining access over a wireless communication channel. In CDMA 1x/DO networks, a mobile device may maintain a list of frequencies for which specified access failures have occurred. Access failures may include being denied a connection due to network loading, observing a threshold number of traffic channel assignment (TCA) timeouts, network authentication failure, point-to-point protocol failure, session negotiation failure, and/or detecting a maximum access probe failure condition. These frequency channels may be FL and/or RL frequency channels of the wireless communication channels. A frequency channel identified as temporarily unavailable for communication may include a frequency band, frequency range, set of frequencies, and/or a center frequency of a wireless communication link.

Channel access failures such as a maximum access probe condition may occur because of poor channel conditions and/or network system problems. Generally, a mobile device may attempt to establish a reverse link with a CDMA 1x/DO base station by performing an access procedure on the RL frequency channel. During the access procedure, the mobile device may transmit access probes and incrementally increase transmit power until a maximum transmit power is reached. If the mobile device is not able to establish the RL at the maximum transmit power ("maximum access probe"), the mobile device may identify the RL frequency channel as temporarily unavailable as a result of a channel access failure. The mobile device may store channel avoidance information for temporarily unavailable FL and/or RL frequencies for the first RAT. The mobile device 115-*a* may use the channel avoidance information to prevent reselection and/or redirection to the temporarily unavailable frequencies for the first RAT for a period of time. For example, performing reselection and/or redirection may be based on channel conditions of FL frequencies measured at the mobile device 115-*a*. In some instances, the mobile device 115-*a* may measure good channel conditions for an FL frequency channel when the mobile device 115-*a* has a history of access failures for the associated RL frequency channel. In this situation, preventing reselection and/or redirection prevents the mobile device from continuing to try to access temporarily unavailable frequencies, which could cause repeated signaling (e.g., access probes, etc.) on the temporarily unavailable frequencies followed by repeated access failures. This repeated signaling may cause significant power consumption in the mobile device.

The second network may include mechanisms for inter-RAT mobility. In some embodiments, the second modem 250 of mobile device 115-*a* may support inter-RAT channel measurement of frequencies and/or channels of other RATs for inter-RAT mobility. For example, an LTE/LTE-A modem supporting communication with UTRAN or E-UTRAN networks may be able to perform measurements on CDMA 1x/DO frequencies and/or other network frequencies. Channel measurement may be based on network information such as a neighbor list or system information block ("SIB") received from the second network 215. While camped on the E-UTRAN network 215 (e.g., via second modem 250), mobile device 115-*a* may receive network information that includes information related to neighboring cells and/or other networks. For example, mobile device 115-*a* may receive a measurement configuration from the E-UTRAN network 215 that includes networks, RATs, frequencies, and/or other information about neighboring cells. The measurement configuration may define various thresholds and events which, when detected by mobile device 115-*a*, trigger a specified action. The action that is triggered may, for instance, include various inter-RAT behaviors. For example, measured channel conditions of other RATs may be used by the mobile device to determine whether to reselect to a neighbor cell using a non-E-UTRAN RAT. Similarly, measured channel conditions may trigger cell redirection and handover procedures. For example, the mobile device may report measured channel conditions for neighbor cells to the second network 215 and the second network 215 may trigger various inter-RAT behaviors.

Inter-RAT mobility issues may arise in such multiple network wireless communication systems because the first network (e.g., CDMA 1x/DO network 210, etc.) may not have a way to inform the second network (e.g., E-UTRAN network 215, etc.) of frequency avoidance information related the first network. For example, the second network may indicate that a mobile device should measure channel conditions for a challenged frequency of the first network. In other instances, the second network may direct the mobile device to a channel having a challenged frequency through inter-RAT redirection of the mobile device. In yet other instances, the mobile device may reselect a channel having a challenged reverse link frequency channel based on channel measurements of the associated forward link frequency channel. These instances result in sub-optimal behavior including unnecessary channel measurements and, in some cases, aborted or unsuccessful inter-RAT network handover. For example, if the mobile device performs inter-RAT reselection of a challenged RL frequency channel of the first RAT based on measurements of the associated FL frequency channel, the first RAT may reject the handover based on the channel avoidance information for the first RAT.

Embodiments are directed to novel techniques for improving inter-RAT mobility performance by using channel avoidance information from a first network in a second network. In some embodiments, the second network queries the first network for channel avoidance information and applies the channel avoidance information in suppressing inter-RAT channel measurements, avoiding inter-RAT redirection, and/or avoiding inter-RAT reselection. In embodiments, suppression of inter-RAT channel measurements, avoiding inter-RAT redirection, and/or avoiding inter-RAT reselection is performed by the mobile device. For example, a first modem of a mobile device may determine channel avoidance information for the first network. A second modem of the mobile device associated with the second network may query the first modem for the channel avoidance information for the first network. The second modem may modify inter-RAT channel measurement behavior based on the channel avoidance information. By modifying inter-RAT channel measurement behavior, the mobile device can avoid reselecting to a challenged frequency, and/or avoid providing measurement reports that could lead to an inter-RAT handover or redirection procedure. In other embodiments, channel avoidance information of the first network may be communicated to other network entities of the second network and the second network may perform the inter-RAT channel measurement suppression, inter-RAT reselection avoidance, and/or inter-RAT redirection avoidance.

Still referring to FIG. 2, consider that the mobile device 115-a may be communicating or attempting communication using the first modem 240 with the first network 210 via base station 105-a. The first modem 240 of mobile device 115-a may be able to receive FL transmission 220-a using a particular FL frequency channel $F_1$ with acceptable signal quality but base station 105-a may not be able to receive RL transmission 225-a using an RL frequency channel $F_2$. Frequency channels $F_1$ and $F_2$ may be paired frequency channels for FDD communication. Frequency $F_2$ may be a frequency band, frequency range, set of frequencies, and/or center frequency of a wireless communication link. For example, a maximum access probe condition may occur when mobile device 115-a attempts to access base station 105-a on RL 225-a using frequency $F_2$. As a result, the first modem 240 may put frequency $F_2$ on a frequency avoidance list for the first network 210. The first modem 240 may avoid frequency $F_2$ for a specific period of time. For example, the first modem 240 may avoid frequency $F_2$ for 1 minute, 5 minutes, 10 minutes, 15 minutes, etc.

While frequency $F_2$ is on the frequency avoidance list of the first modem 240, mobile device 115-a may use the second modem 250 to communicate with or camp on the second network 215 via base station 105-b over forward link 220-b and reverse link 225-b. The second modem 250 may monitor channel conditions according to its measurement configuration and utilize system information to assist in determining whether mobile device 115-a should reselect to a different base station and/or network, send measurement reports, etc. For example, the second modem 250 may receive a neighbor list via the second network 215 that indicates neighboring cells including base station 105-a and/or base station 105-c. The second modem 250 may conduct channel measurements of cells in its neighbor list, including frequency $F_1$. However, because the RL frequency channel $F_2$ is challenged, conducting such measurements may unnecessarily consume power and lead to sub-optimal inter-RAT behavior.

Embodiments are directed to using the channel avoidance information of the first network to improve inter-RAT mobility in a multiple network wireless communications system. For example, the second modem 250 may query the first modem 240 for channel avoidance information. The first modem 240 may provide channel avoidance information including the challenged frequencies (e.g., frequency $F_2$, etc.) and the remaining channel avoidance time for each challenged frequency. The second modem 250 may maintain channel avoidance information for other RATs for suppressing inter-RAT channel measurements, avoiding inter-RAT reselection, and/or avoiding inter-RAT redirection.

In some embodiments, other network entities of the second network 215 may maintain channel avoidance information related to the first network 210 for improving inter-RAT mobility performance. For example, the second modem 250 may send the channel avoidance information to the second network 215 via base stations 105-b and/or 105-c. The second network 215 may perform inter-RAT channel measurement suppression, inter-RAT reselection avoidance, and/or inter-RAT redirection avoidance for mobile device 115-a for frequencies on the channel avoidance list for the specified periods of time. In embodiments, the second network 215 may perform inter-RAT channel measurement suppression, inter-RAT reselection avoidance, and/or inter-RAT redirection avoidance for other mobile devices 115 based on the channel avoidance information received from mobile device 115-a. For example, the second network 215 may suppress channel measurements of frequency $F_1$ and/or avoid inter-RAT reselection and/or inter-RAT redirection to the first network 210 at frequencies $F_1$ and/or $F_2$ for other mobile devices 115 that may be within the cell coverage area of base station 105-a. Suppression of inter-RAT channel measurements and avoidance of inter-RAT reselection and/or inter-RAT redirection may be further based on location information of the mobile devices 115 such as proximity of the mobile devices 115 to mobile device 115-a.

Figure 3A:
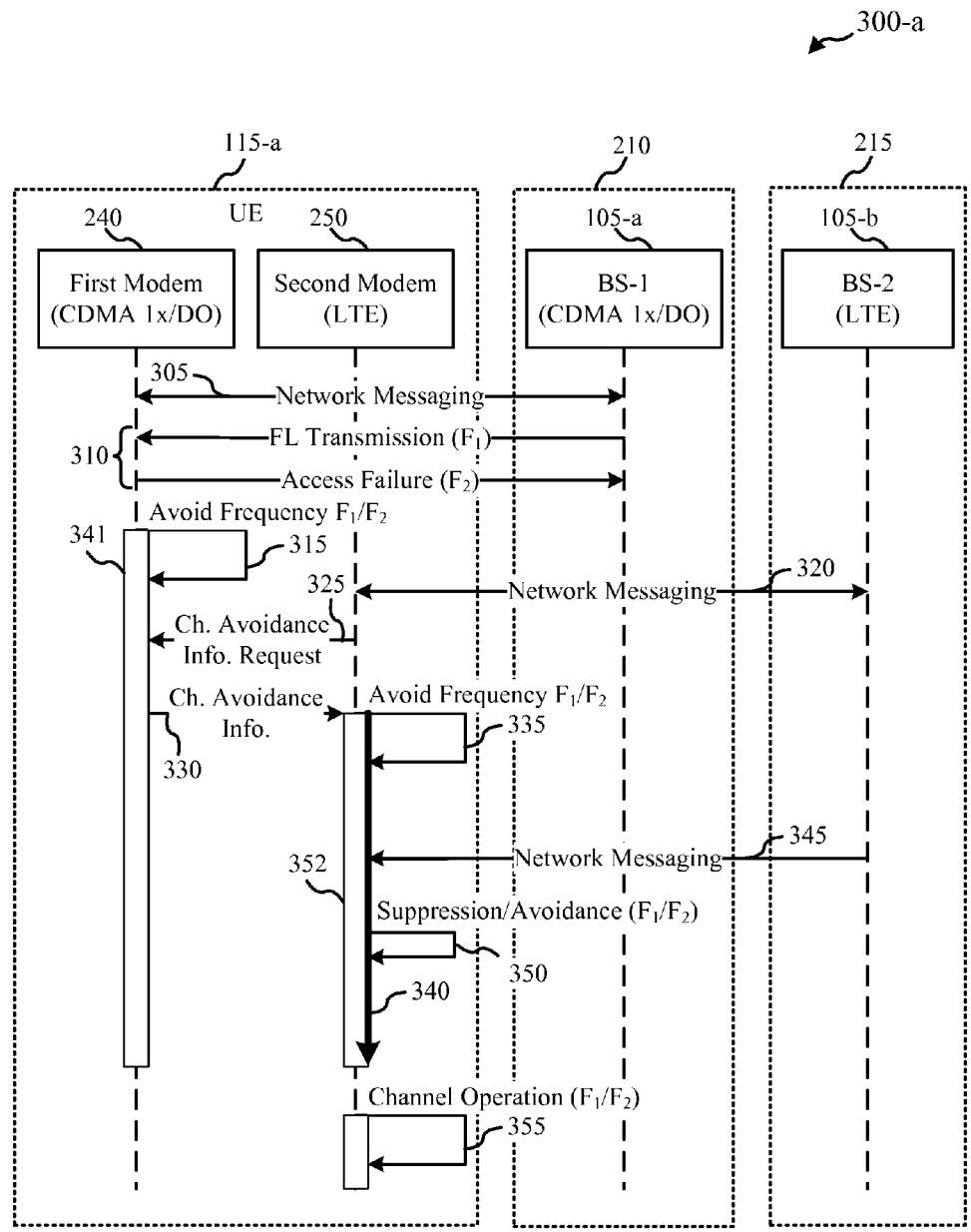
FIG. 3A shows a process flow that illustrates aspects of improving inter-RAT mobility in a multiple network wireless communications system in accordance with various embodiments.

FIG. 3A shows a process flow 300-a that illustrates aspects of improving inter-RAT mobility in a multiple network wireless communications system in accordance with various embodiments. Process flow 300-a may be used in multiple network wireless communications systems such as system 100 illustrated in FIG. 1 and/or system 200 illustrated in FIG. 2. At step 305 of process flow 300-a, mobile device 115-a exchanges control messaging and/or communications with the first network 210 via base station 105-a. For example, base station 105-a and mobile device 115-a may exchange control messaging to initiate a transmission over FL 220-a and RL 225-a using paired frequencies $F_1$ and $F_2$, respectively. At step 310, mobile device 115-a may receive a transmission from the base station 105-a over frequency $F_1$ while an access failure may occur for frequency $F_2$. For example, the network may deny access due to loading condition, a threshold number of TCA timeouts may be reached, a maximum access probe condition may occur, etc.

At step 315, the first network 210 determines frequency avoidance information 341 for frequencies $F_1$ and/or $F_2$ for the first network 210. For example, the first modem 240 may associate frequencies $F_1$ and/or $F_2$ with a channel avoidance time period for the first network 210. The first modem 240 may maintain a channel avoidance timer for tracking the channel avoidance time period associated with frequencies $F_1$ and/or $F_2$. Subsequently, the mobile device 115-*a* may continue to communicate with the first network 210 using other frequencies and/or through a different base station 105 or the mobile device 115-*a* may discontinue communication with the first network 210 if other frequencies and/or other base stations 105 associated with the first network 210 are unavailable.

At step 320, mobile device 115-*a* may discontinue communication with the first network and establish communication with the second network 215. For example, the mobile device 115-*a* may be handed over from the first network 210 to the second network 215. Thus, at 320, the mobile device 115-*a* may register on the second network and may be in an idle state or a connected state. For example, mobile device 115-*a* may exchange control messaging and/or communications with the second network 215 via base station 105-*b* at step 320. Base station 105-*b* and mobile device 115-*a* may exchange control messaging or initiate data transmissions over FL 220-*b* and RL 225-*b*.

At step 325, the second network 215 may request channel avoidance information from the first network 210. In some embodiments, the second modem 250 of the mobile device 115-*a* requests channel avoidance information related to the first network 210 from the first modem 240. At step 330, the first network 210 communicates channel avoidance information related to the first network 210 to the second network 215. In some embodiments, the first modem 240 of the mobile device 115-*a* provides channel avoidance information 341 to the second modem 250. The channel avoidance information 341 may include, for example, frequencies $F_1$ and/or $F_2$ and/or channel avoidance time period information such as the remaining time on the frequency avoidance timer associated with frequencies $F_1$ and/or $F_2$ in the first modem 240. At step 335, the second network 215 determines inter-RAT channel avoidance information 352 based on the received channel avoidance information 341. For example, the second modem 250 may maintain a channel avoidance timer 340 associated with frequencies $F_1$ and/or $F_2$ that corresponds with the remaining time of the channel avoid timer of channel avoidance information 341 associated with frequencies $F_1$ and/or $F_2$.

The second network 215 may utilize the channel avoidance information 352 related to the first network 210 to suppress and/or avoid inter-RAT operations related to temporarily unavailable frequency channels. For example, the mobile device 115-*a* may receive network communication messages from the second network 215 at step 345 that indicate the mobile device 115-*a* should perform inter-RAT operations related to frequencies $F_1$ and/or $F_2$. At step 350, the mobile device 115-*a* may suppress and/or avoid the inter-RAT operations related to the avoided frequencies $F_1$ and/or $F_2$ based on the channel avoidance information 352.

In some embodiments, the network messages received by the second modem 250 at step 345 indicate that the mobile device 115-*a* should perform inter-RAT channel measurements on frequency channel $F_1$. For example, the network messages received at step 345 may include a measurement configuration that indicates that frequency channels associated with base station 105-*a* should be measured by the second modem 250. At step 350, the second modem 250 may suppress inter-RAT channel measurements of frequency channel $F_1$ based on the channel avoidance information 352. The second modem 250 may suppress channel measurements of frequency channel $F_1$ for the time period remaining of the channel avoid timer associated with frequencies $F_1$ and/or $F_2$. After the expiration of the channel avoid timer, the second modem 250 may perform channel measurements on frequency channel $F_1$.

In some embodiments, the mobile device 115-*a* may avoid inter-RAT reselection and/or redirection to frequency channel $F_1$ based on the channel avoidance information 352. For example, the second network 215 may utilize a measurement-based reselection and/or redirection procedure in which the second network 215 obtains inter-RAT channel measurement information from mobile devices 115 and determines inter-RAT reselection and/or redirection behavior based on the obtained channel measurement information. To avoid inter-RAT reselection and/or redirection to frequency channels $F_1$ and/or $F_2$ based on the channel avoidance information 352, the second modem 250 may suppress the reporting to network 215 of channel measurement information related to frequency channel $F_1$ at step 350.

In some embodiments, the second modem 250 may avoid inter-RAT redirection to frequency channel $F_1$ for networks using other redirection procedures. These redirection procedures may be, for example, redirection procedures that are not measurements based (e.g., blind redirection, etc.). For example, the second network 215 may determine based on mobile device location information, channel conditions information, mobile device usage, and/or other factors, that mobile device 115-*a* should be redirected to establish a connection with the first network 210 via base station 105-*a* over frequencies $F_1$ and/or $F_2$. In this instance, the network messages received by the second modem 250 at step 345 may indicate that the wireless communications system is requesting or commanding an inter-RAT redirection of mobile device 115-*a* from the second network 215 to the first network 210 at frequencies $F_1$ and/or $F_2$. At step 350, the mobile device may, based on the channel avoidance information 352, avoid redirection to the first network 210 via base station 105-*a* over frequencies $F_1$ and/or $F_2$. For example, the second modem 250 may not acknowledge the inter-RAT redirection command/request from the second network 215.

Where inter-RAT reselection is directed by the mobile device 115-*b*, the mobile device 115-*b* may avoid reselection to frequencies $F_1$ and/or $F_2$ based on the inter-RAT channel avoidance information 352. For example, the second modem 250 may determine that favorable inter-RAT reselection conditions exist based on channel conditions information (e.g., FL conditions, etc.), mobile device usage, and/or other factors. At step 350, the second modem 250 may avoid inter-RAT reselection to base station 105-*a* using frequencies $F_1$ and/or $F_2$, even when factors such as FL channel conditions (e.g., channel conditions for F2) are favorable for inter-RAT reselection. The second modem 250 may avoid inter-RAT reselection for a period of time indicated by a channel avoid timer associated with the frequencies $F_1$ and/or $F_2$.

In embodiments, the mobile device 115-*a* allows inter-RAT operations related to the avoided frequencies $F_1$ and/or $F_2$ after the expiration of the channel avoidance time period associated with frequencies $F_1$ and/or $F_2$. For example, the mobile device 115-*a* may perform channel measurements on frequency $F_1$ at step 355 of process flow 300-*a* after the channel avoidance time period associated with frequencies $F_1$ and/or $F_2$ has expired.

Figure 3B:
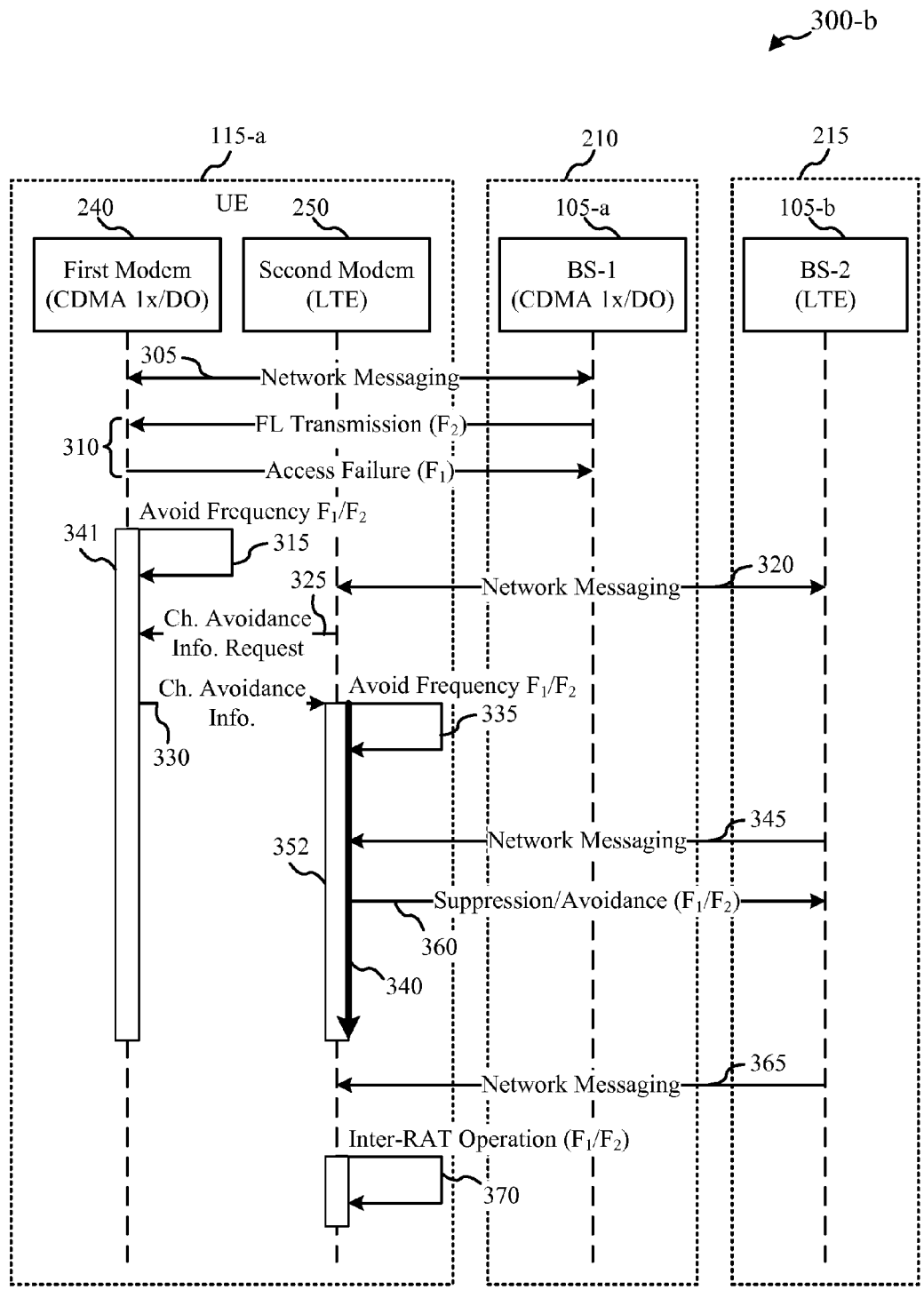
FIG. 3B shows a process flow that illustrates aspects of improving inter-RAT mobility in a multiple network wireless communications system in accordance with various embodiments.

FIG. 3B shows a process flow 300-*b* that illustrates aspects of improving inter-RAT mobility in a multiple network wireless communications system in accordance with various embodiments. Process flow 300-*b* may be used in multiple network wireless communications systems such as system 100 illustrated in FIG. 1 and/or system 200 illustrated in FIG. 2. In process flow 300-b, the second modem 250 may utilize the channel avoidance information 352 to avoid inter-RAT operations related to frequencies $F_1$ and/or $F_2$. For example, the mobile device 115-a may receive network communication messages from the second network 215 at step 345 that indicate the mobile device 115-a should perform inter-RAT operations related to frequencies $F_1$ and/or $F_2$.

At step 350, the mobile device 115-a may suppress and/or avoid the inter-RAT operations related to the avoided frequencies $F_1$ and/or $F_2$ based on the channel avoidance information 352. For example, the network messages received at step 345 may include a measurement configuration that indicates that frequency channels associated with base station 105-a should be measured by the second modem 250. The second modem 250 may report false channel information for frequency channel $F_1$ at step 350. For example, even where frequency channel $F_1$ appears to be acceptable for communication based on channel measurements, the second modem 250 may report poor or unacceptable channel conditions for frequency channel $F_1$ to the second network 215.

The mobile device 115-b may also avoid network directed reselection and/or redirection (connected state or idle state) at step 350. For example, the second network 215 may send an inter-RAT redirection request to the mobile device 115-a at step 345 and the mobile device 115-b may negatively reply at step 360 to the inter-RAT redirection request from the second network 215 (e.g., respond to network 215 with in inter-RAT redirection failure message, etc.).

After expiration of the channel avoid timer associated with frequency $F_1$, the mobile device 115-a may perform inter-RAT operations relating to frequencies $F_1$ and/or $F_2$. For example, the network may send a measurement request for frequency $F_1$ at step 365 and the mobile device 115-a may perform the measurements at step 370. The mobile device 115-a may also perform a reselection and/or redirection to base station 105-a at frequencies $F_1$ and/or $F_2$ at step 370 depending on the inter-RAT reselection and/or redirection factors described above.

Figure 3C:
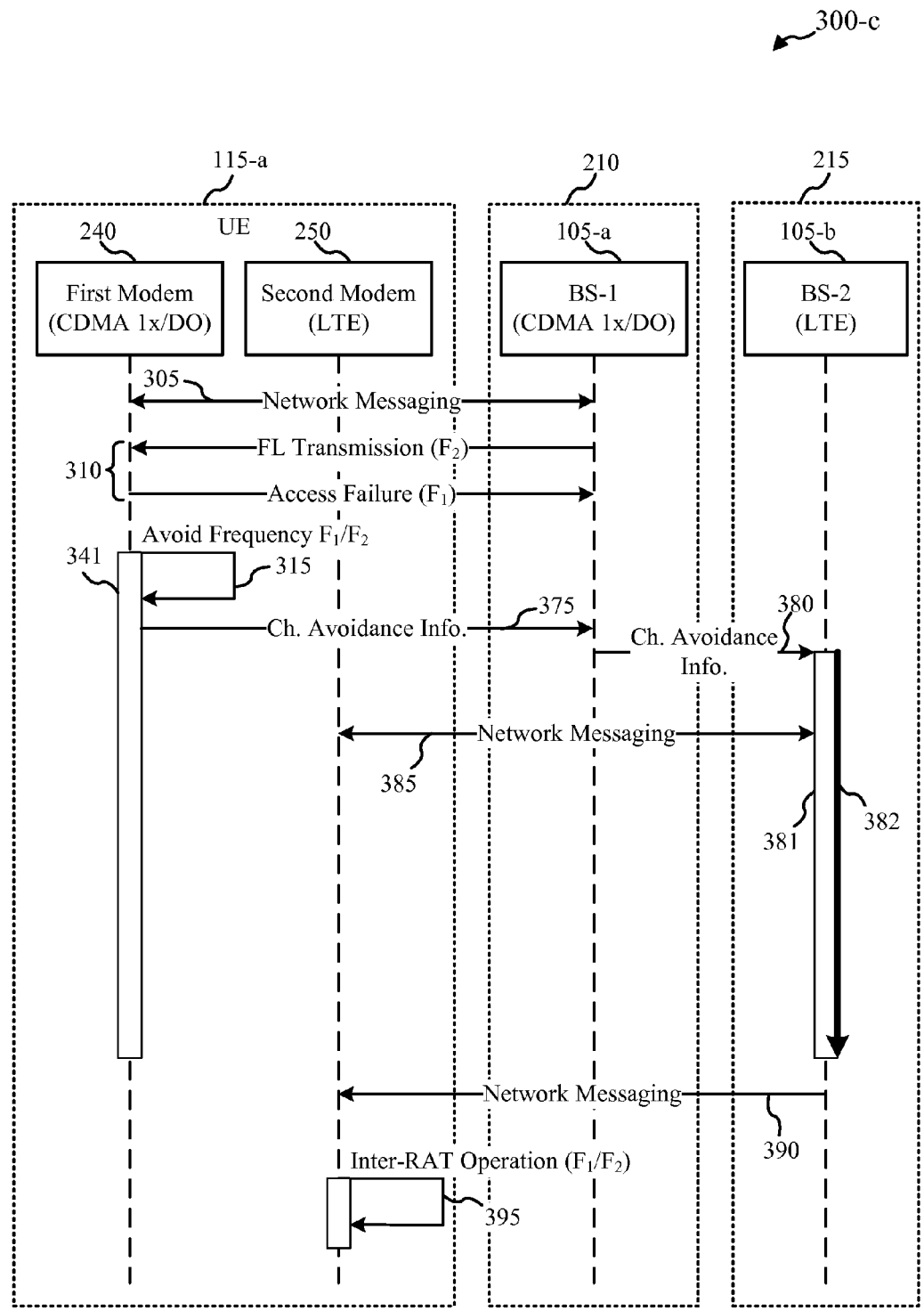
FIG. 3C shows a process flow that illustrates aspects of improving inter-RAT mobility in a multiple network wireless communications system in accordance with various embodiments.

FIG. 3C shows a process flow 300-c that illustrates aspects of improving inter-RAT mobility in a multiple network wireless communications system in accordance with various embodiments. Process flow 300-c may be used in multiple network wireless communications systems such as system 100 illustrated in FIG. 1 and/or system 200 illustrated in FIG. 2.

In process flow 300-c, the second network 215 may utilize channel avoidance information to avoid inter-RAT operations related to frequencies $F_1$ and/or $F_2$. For example, the mobile device 115-a may transmit a message 375 to the first network 210 that includes information related to challenged frequencies for the mobile device 115-a. The first network 210 may send a message 380 to the second network 215 forwarding channel avoidance information for the mobile device 115-a. Message 380 may include additional channel avoidance information for mobile device 115-a measured by the base station 105-a (e.g., challenged FL frequencies, RL frequencies with poor channel conditions, etc.). The second network 215 may determine inter-RAT channel avoidance information 381 based on the message 380. The inter-RAT channel avoidance information 381 may include a timer 382 associated with avoiding inter-RAT mobility operations directed to frequencies $F_1$ and/or $F_2$ for mobile device 115-a.

Subsequently, the mobile device 115-a may register on the second network 215. The mobile device 115-a and the second network 215 may exchange control and/or data transmissions at 385. The second network 215 may use the inter-RAT channel avoidance information 381 to avoid and/or suppress inter-RAT mobility of mobile device 115-a for the time period associated with the timer 382. The second network 215 may, for example, avoid inter-RAT reselection and/or redirection of mobile device 115-a to frequencies $F_1$ and/or $F_2$. Additionally or alternatively, the second network may suppress inter-RAT measurements for frequency $F_1$ (e.g., not include $F_1$ in channel measurement lists sent to the mobile device 115-a). After the expiration of timer 382, the second network 215 may perform inter-RAT mobility procedures directed to frequencies $F_1$ and/or $F_2$. For example, the second network 215 may send message 390 to mobile device 115-a and the mobile device may perform an inter-RAT operation directed to frequencies $F_1$ and/or $F_2$ (e.g., channel measurements, inter-RAT reselection and/or redirection, etc.) at 395.

Figure 4:
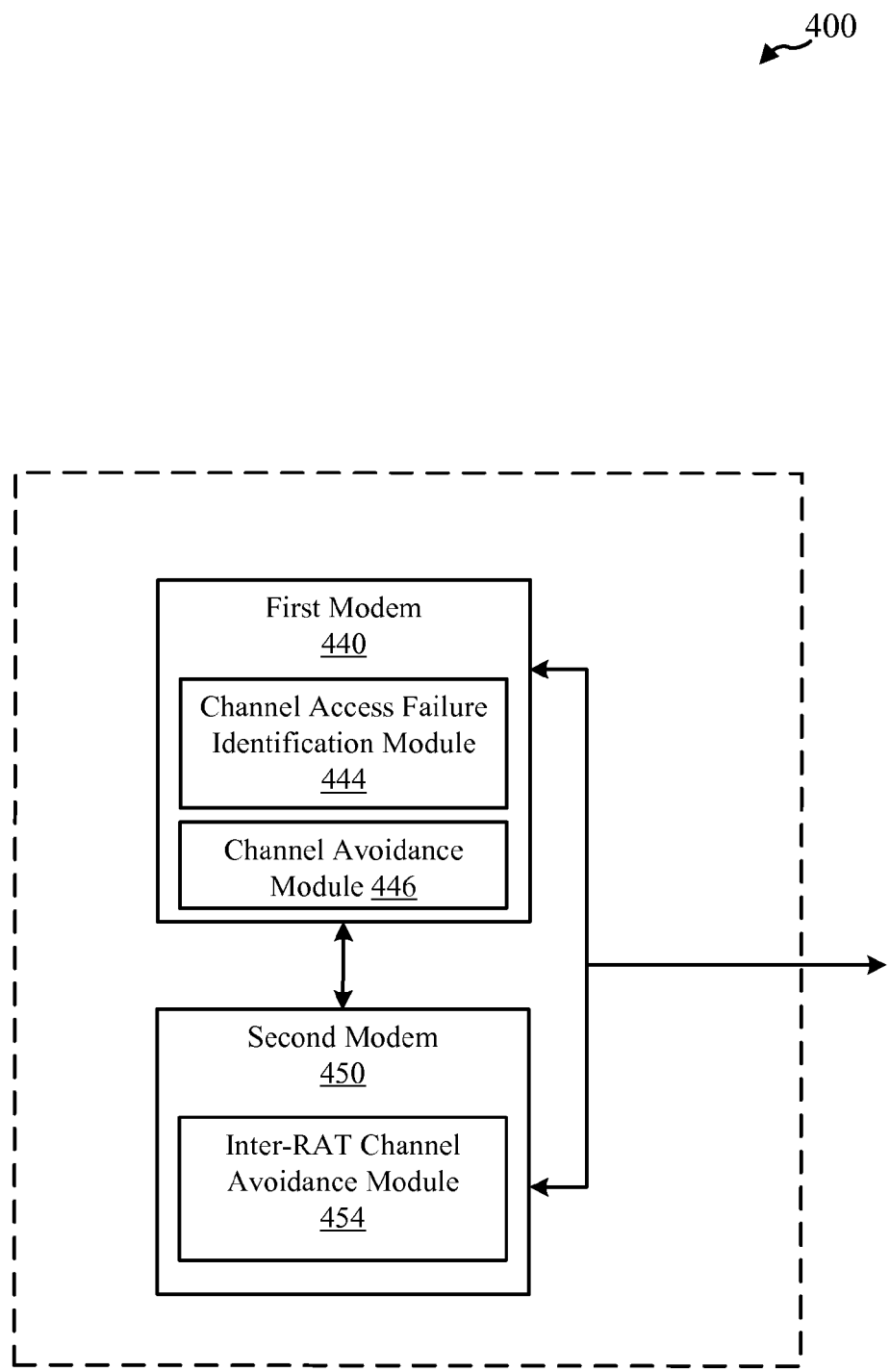
FIG. 4 illustrates a device for utilizing channel avoidance information related to a first network within a second network, according to various embodiments.

FIG. 4 illustrates a device 400 for utilizing channel avoidance information related to a first network within a second network, according to various embodiments. The device 400 may be an example of one or more aspects of mobile devices 115 described with reference to FIG. 1, FIG. 2, FIG. 3A, FIG. 3B, FIG. 3C, FIG. 5, and/or FIG. 8. Device 400 may be implemented using one or more processors. Device 400 may include a first modem 440 that supports a first RAT of a first network. For example, the first modem 440 may support a CDMA air interface such as CDMA 1x/DO. Device 400 may includes a second modem 450 that supports a second RAT of a second network. For example, the second modem 450 may support an LTE/LTE-A air interface for communication with UTRAN or E-UTRAN networks.

The first modem 440 may include a channel access failure identification module 444 for identifying frequency channels associated with access failures between the device 400 and another network entity (e.g., mobile device, base station, etc.) for a first RAT. The first modem 440 may include a channel avoidance module 446 for determining channel avoidance information for the first RAT associated with the identified frequency channels.

The second modem 450 may include an inter-RAT channel avoidance module 454 that is operable to receive avoidance information related to the first RAT and determine avoidance information for the second RAT based on the received avoidance information for the first RAT. The inter-RAT channel avoidance module 454 may be configured to avoid inter-RAT operations based on the avoidance information related to the first RAT as described above with reference to FIG. 2, FIG. 3A, and/or FIG. 3B. For example, the inter-RAT channel avoidance module 454 may be configured to suppress inter-RAT channel measurements, report false inter-RAT channel measurements, and/or avoid inter-RAT reselection and/or redirection as described above with reference to FIG. 2, FIG. 3A, and/or FIG. 3B.

Components of device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. In one aspect, the mobile device 115-b maintains separate protocol stacks for 1xEV-DO and LTE communications. For example, the first modem 440 may include a 1xEV-DO protocol stack and the second modem 450 may include an LTE protocol stack. Mobile device **115-*b*** may share information across independent protocol stacks providing a common access to avoidance lists, timer values, etc. in the performance of the operations described herein.

Figure 5:
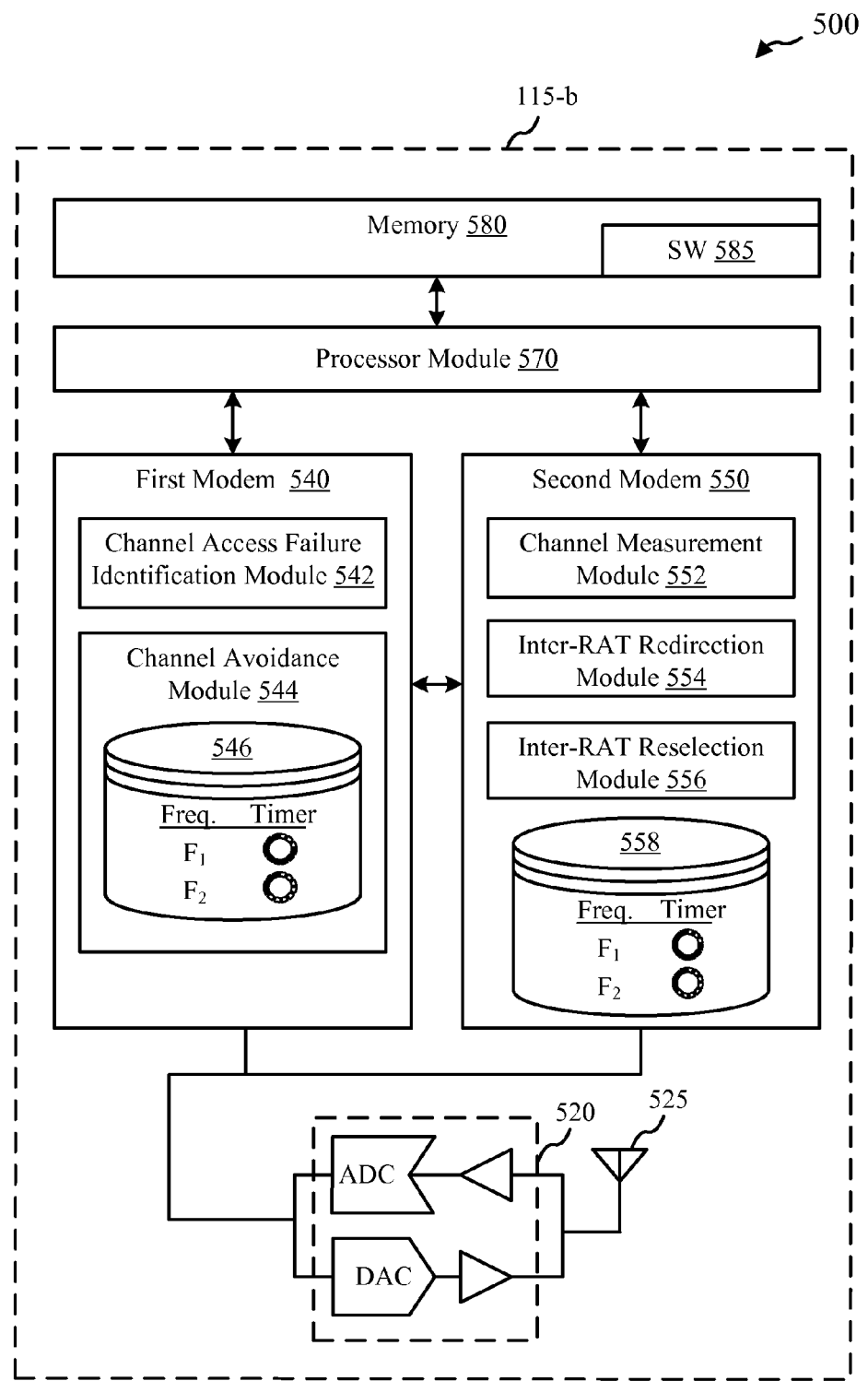
FIG. 5 illustrates a device for utilizing channel avoidance information related to a first network within a second network, according to various embodiments.

FIG. 5 is a diagram 500 illustrating a mobile device **115-*b* for utilizing channel avoidance information related to a first network within a second network, according to various embodiments. The mobile device 115-*b* may be an example of one or more aspects of mobile devices 115 described with reference to FIG. 1, FIG. 2, FIG. 3A, FIG. 3B, FIG. 4, and/or FIG. 8. The mobile device 115-*b* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-*b*** may have an internal power supply (not shown), such as a small battery, to facilitate mobile operation.

The mobile device **115-*b* may generally include components for bi-directional voice and data communications including components for transmitting communications and components for receiving communications. The mobile device 115-*b* may include antenna(s) 525, a transceiver module 520, memory 580, a first modem 540, a second modem 550, and a processor module 570, which each may be in communication, directly or indirectly, with each other (e.g., over one or more buses). The transceiver module 520 may be configured to communicate bi-directionally, via the antenna(s) 525. The first modem 540 and the second modem 550 may be examples of the first modem 440 and second modem 450 illustrated in device 400**.

The first modem 540 may include a channel access failure identification module 542 for identifying frequency channels associated with channel access failures between the mobile device **115-*b* and another network entity (e.g., mobile device, base station, etc.) for a first RAT. The first modem 540 may include a channel avoidance module 544 for determining channel avoidance information for the first RAT associated with the identified frequency channels. For example, the channel avoidance information may be maintained in a channel avoidance list 546 that stores the avoided frequencies and remaining time periods for channel avoidance of the avoided frequencies. The channel avoidance module 544 may perform channel avoidance for the first modem 540. For example, if the mobile device 115-*b* is redirected to an avoided frequency channel, the channel avoidance module 544 may prevent the first modem 540** from attempting to establish a communication link using the avoided frequency channel.

The second modem 550 may include a channel measurement module 552, an inter-RAT redirection module 554, and/or an inter-RAT reselection module 556. The second modem may store inter-RAT channel avoidance information in a channel avoidance list 558 that stores the avoided frequencies and remaining time periods for channel avoidance of the avoided frequencies. Channel measurement module 552 may be configured to perform inter-RAT channel measurements based on a measurement configuration of the mobile device, information obtained from system information messages, etc. Channel measurement module 552 may be configured to suppress inter-RAT channel measurements of frequency channels on the channel avoidance list 558 as described above with reference to FIG. 2, FIG. 3A, and/or FIG. 3B. The inter-RAT redirection module 554 may be configured to avoid inter-RAT redirection by suppressing reporting of inter-RAT channel measurements and/or negatively responding to inter-RAT redirection commands based on the channel avoidance list 558 as described above with reference to FIG. 2, FIG. 3A and/or FIG. 3B. The inter-RAT reselection module 556 may be configured to avoid inter-RAT reselection based on the channel avoidance list 558 as described above with reference to FIG. 2, FIG. 3A and/or FIG. 3B.

The memory 580 may include random access memory (RAM) and read-only memory (ROM). The memory 580 may also store computer-readable, computer-executable software code 585 containing instructions that are configured to, when executed, cause the processor module 570 to perform various functions described herein (e.g., call processing, database management, message routing, identification of channel access failures, inter-RAT channel measurement suppression, inter-RAT redirection avoidance, inter-RAT reselection avoidance, etc.). Alternatively, the software code 585 may not be directly executable by the processor module 570 but be configured to cause the computer, e.g., when compiled and executed, to perform functions described herein.

The processor module 570 may include an intelligent hardware device, e.g., a central processing unit (CPU) such as those made by Intel® Corporation or AMD®, a microcontroller, an application-specific integrated circuit (ASIC), etc. The mobile device **115-*b* may include a speech encoder (not shown) configured to receive audio via a microphone, convert the audio into packets (e.g., 20 ms in length, 30 ms in length, etc.) representative of the received audio, provide the audio packets to the transceiver module 520**, and provide indications of whether a user is speaking.

Figure 6:
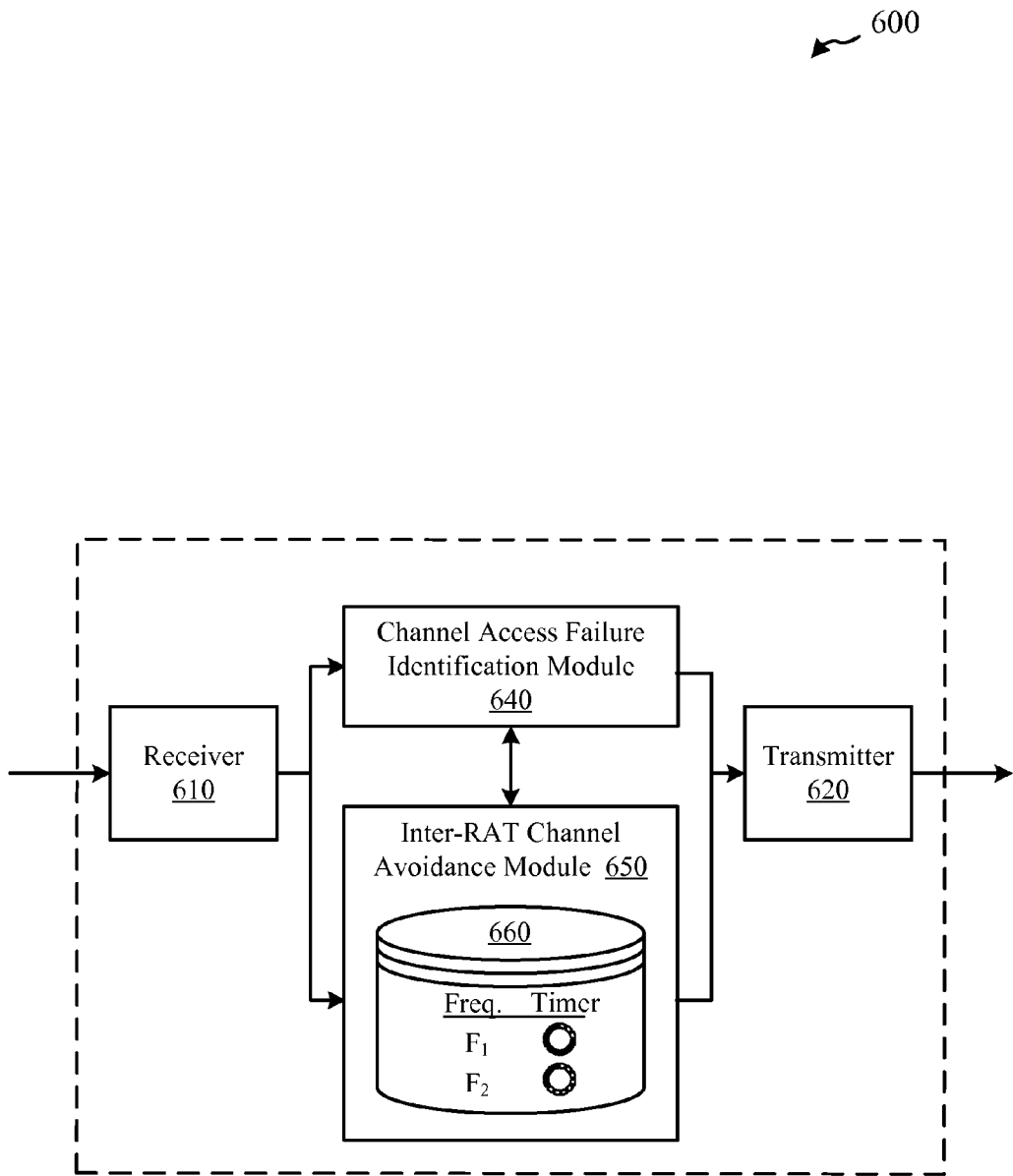
FIG. 6 shows a block diagram of a communications system that may be configured for improving inter-RAT mobility performance in a multiple network wireless communications system in accordance with various embodiments.

FIG. 6 shows a block diagram of a device 600 that may be configured for improving inter-RAT mobility performance in accordance with various embodiments. The device 600 may be an example of aspects of the system 100 depicted in FIG. 1 and/or system 200 of FIG. 2. For example, the device 600 may illustrate aspects of base stations 105 illustrated in FIG. 1, FIG. 2, FIG. 3A, FIG. 3B, FIG. 3C, FIG. 7, and/or FIG. 8. The device 600 may include receiver 610, transmitter 620, a channel access failure identification module 640, and an inter-RAT channel avoidance module 650. The inter-RAT channel avoidance module 650 may store channel avoidance information in channel avoidance list 660 that stores the avoided frequencies and remaining time periods for inter-RAT channel avoidance of the avoided frequencies.

Channel access failure identification module 640 may be operational to identify frequency channels associated with channel access failures between mobile devices 115 and the device 600 for a first RAT. The inter-RAT channel avoidance module 650 may be operational to avoid inter-RAT reselection and/or inter-RAT redirection as described above with reference to FIG. 2 and/or FIG. 3C. The inter-RAT channel avoidance module 650 may be configured to suppress inter-RAT channel measurements as described above with reference to FIG. 2 and/or FIG. 3C. For example, the inter-RAT channel avoidance module 650 may suppress channel measurement control information sent to mobile devices (e.g., neighbor list, SIB, etc.) based on the channel avoidance information in channel avoidance list 660.

Components of device 600 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 7:
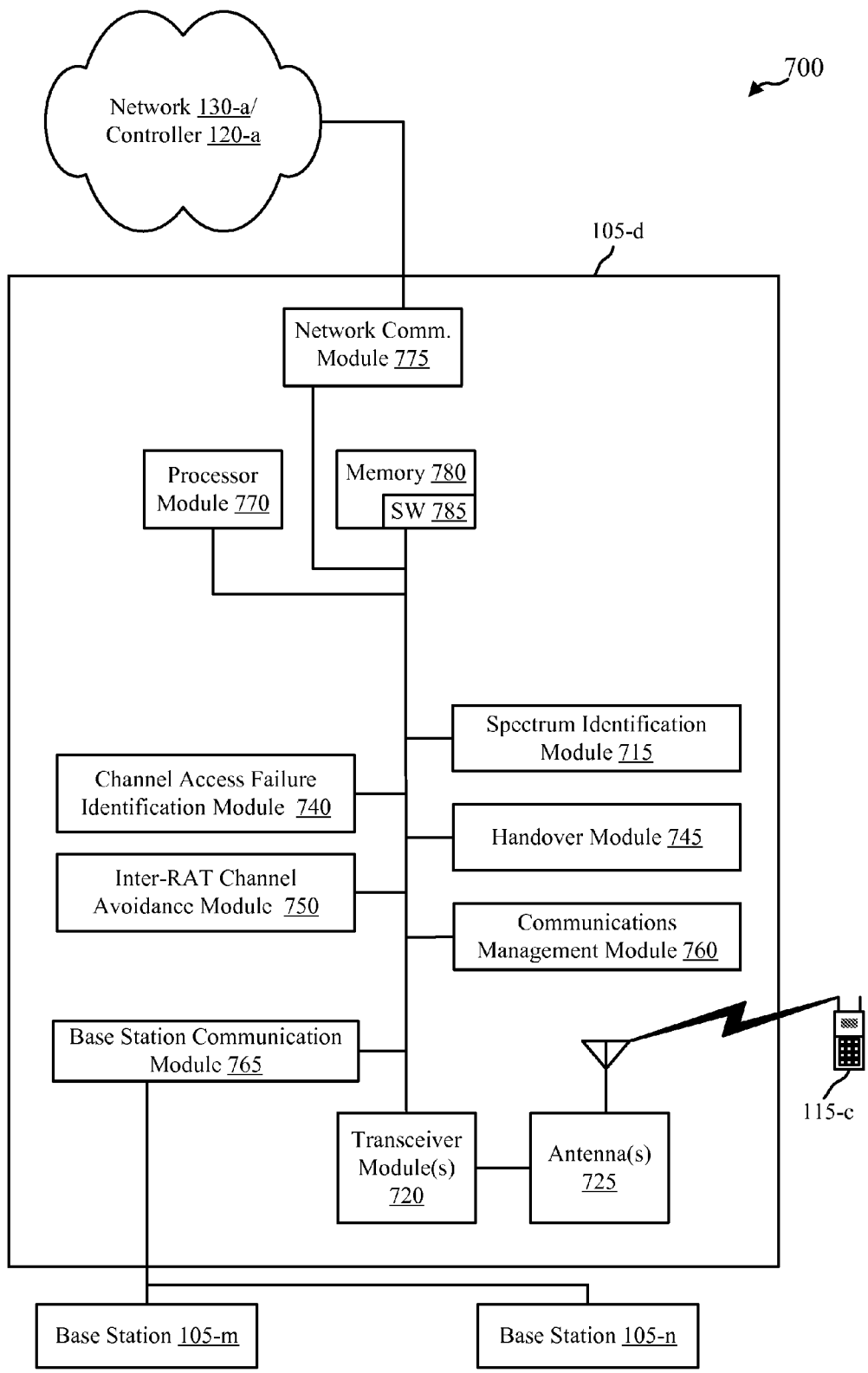
FIG. 7 shows a block diagram of a communications system that may be configured for improving inter-RAT mobility performance in a multiple network wireless communications system in accordance with various embodiments.

FIG. 7 shows a block diagram of a communications system 700 that may be configured for improving inter-RAT mobility performance in accordance with various embodiments. This system 700 may be an example of aspects of the system 100 depicted in FIG. 1 and/or system 200 of FIG. 2. For example, aspects of the system 700 may be implemented in a base station 105-d. The base station 105-e may include antenna(s) 725, a transceiver module 720, memory 780, and a processor module 770, which each may be in communication, directly or indirectly, with each other (e.g., over one or more buses). The transceiver module 720 may be configured to communicate bi-directionally, via the antenna(s) 725, with the mobile device 115-c, which may be a multi-mode mobile device. The transceiver module 720 (and/or other components of the base station 105-e) may also be configured to communicate bi-directionally with one or more networks. In some cases, the base station 105-d may communicate with the core network 130-a and/or controller 120-a through network communications module 775. Base station 105-d may be an example of an eNodeB base station, a Home eNodeB base station, a NodeB base station, and/or a Home NodeB base station. Controller 120-a may be integrated into base station 105-d in some cases, such as with an eNodeB base station.

Base station 105-d may also communicate with other base stations 105, such as base station 105-m and base station 105-n. Each of the base stations 105 may communicate with mobile device 115-c using different wireless communications technologies, such as different radio access technologies. In some cases, base station 105-d may communicate with other base stations such as 105-m and/or 105-n utilizing base station communication module 765. In some embodiments, base station communication module 765 may provide an X2 interface within an LTE/LTE-A wireless communication technology to provide communication between some of the base stations 105. In some embodiments, base station 105-d may communicate with other base stations through controller 120-a and/or core network 130-a.

The memory 780 may include random access memory (RAM) and read-only memory (ROM). The memory 780 may also store computer-readable, computer-executable software code 785 containing instructions that are configured to, when executed, cause the processor module 770 to perform various functions described herein (e.g., call processing, database management, message routing, identification of channel access failures, inter-RAT channel measurement suppression, inter-RAT redirection avoidance, inter-RAT reselection avoidance, etc.). Alternatively, the software code 785 may not be directly executable by the processor module 770 but be configured to cause the computer, e.g., when compiled and executed, to perform functions described herein.

The processor module 770 may include an intelligent hardware device, e.g., a central processing unit (CPU) such as those made by Intel® Corporation or AMD®, a microcontroller, an application-specific integrated circuit (ASIC), etc. The processor module 770 may include a speech encoder (not shown) configured to receive audio via a microphone, convert the audio into packets (e.g., 30 ms in length, etc.) representative of the received audio, provide the audio packets to the transceiver module 720, and provide indications of whether a user is speaking. Alternatively, an encoder may only provide packets to the transceiver module 720, with the provision or withholding/suppression of the packet itself providing the indication of whether a user is speaking.

The transceiver module 720 may include one or more modems configured to modulate the packets and provide the modulated packets to the antenna(s) 725 for transmission, and to demodulate packets received from the antenna(s) 725. While some examples of the base station 105-d may include a single antenna 725, the base station 105-d preferably includes multiple antennas 725 for multiple links which may support carrier aggregation. For example, one or more links may be used to support macro communications with mobile device 115-c.

According to the architecture of FIG. 7, the base station 105-d may further include a communications management module 760. The communications management module 760 may manage communications with other base stations 105. By way of example, the communications management module 760 may be a component of the base station 105-d in communication with some or all of the other components of the base station 105-d via a bus. Alternatively, functionality of the communications management module 760 may be implemented as a component of the transceiver module 720, as a computer program product, and/or as one or more controller elements of the processor module 770.

The components for base station 105-d may be configured to implement aspects discussed above with respect to device 600 of FIG. 6 and may not be repeated here for the sake of brevity. For example, base station 105-d may include a channel access failure identification module 740 and/or inter-RAT channel avoidance module 750. Channel access failure identification module 740 may perform one or more of the features described above with reference to channel access failure identification modules 640. Inter-RAT channel avoidance module 750 may perform one or more of the features described above with reference to inter-RAT channel avoidance module 650. In some embodiments, the functionality of channel access failure identification module 740, and/or inter-RAT channel avoidance module 750 is performed by processor module 770 instead of in separate modules as illustrated in FIG. 7.

The base station 105-d may also include a spectrum identification module 715. The spectrum identification module 715 may be utilized to identify spectrum available for wireless transmissions. In some embodiments, a handover module 745 may be utilized to perform handover procedures of the mobile device 115-c from one base station 105 to another. For example, the handover module 745 may perform a handover procedure (e.g., redirection and/or reselection) of the mobile device 115-c from base station 105-d to another base station 105.

In some embodiments, the transceiver module 720 in conjunction with antenna(s) 725, along with other possible components of base station 105-d, may transmit information regarding inter-RAT channel avoidance from the base station 105-d to the mobile device 115-c, to other base stations 105-m/105-n, or core network 130-a. In some embodiments, the transceiver module 720 in conjunction with antenna(s) 725, along with other possible components of base station 105-d, may transmit information to the mobile device 115-c, to other base stations 105-m/105-n, or core network 130-a, such as channel avoidance information, such that these devices or systems may utilize the channel avoidance information.

Figure 8:
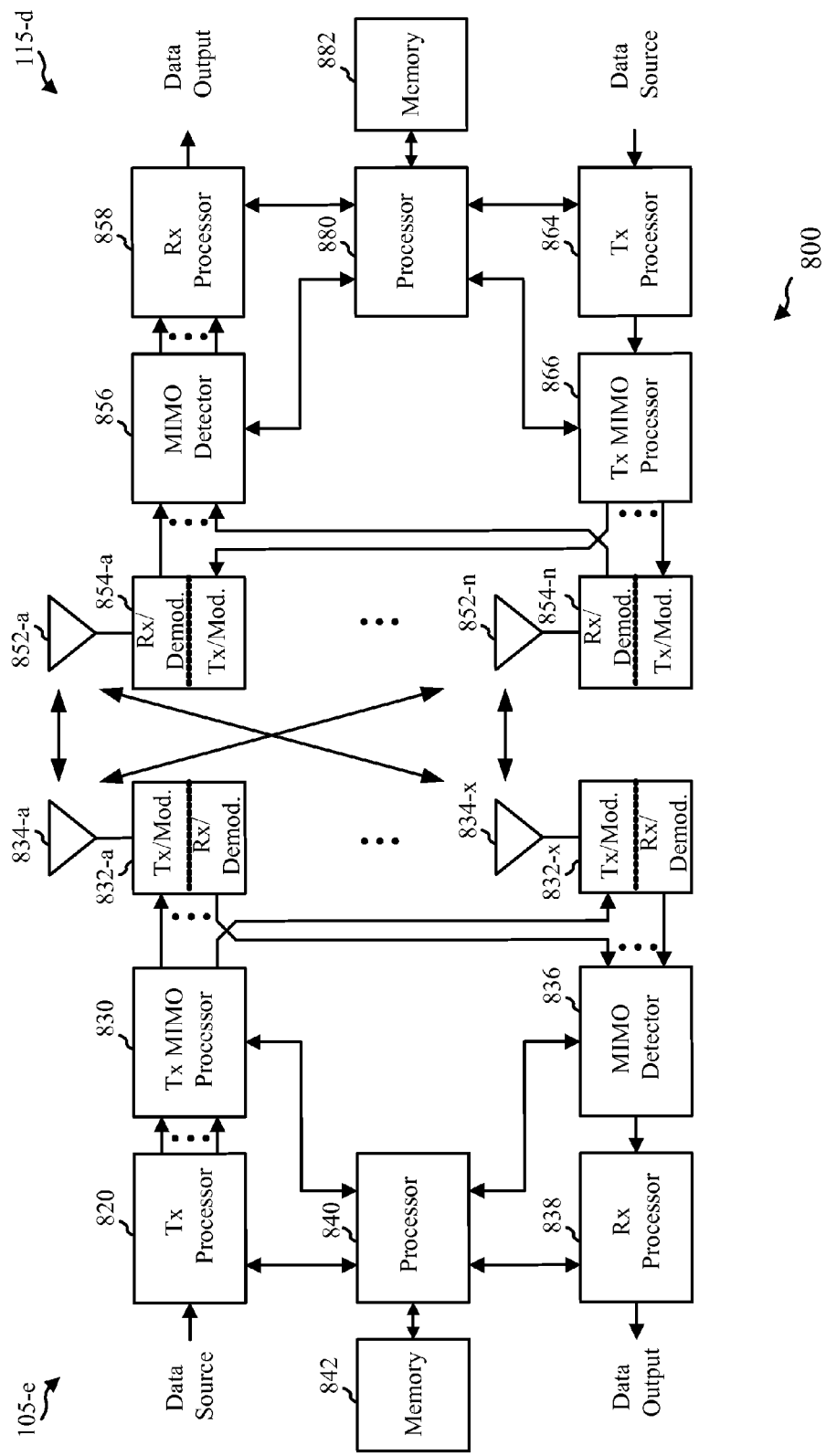
FIG. 8 shows a block diagram of a communications system that may be configured for improving inter-RAT mobility performance in a multiple network wireless communications system in accordance with various embodiments.

FIG. 8 is a block diagram of a system 800 including a base station 105-e and a mobile device 115-d in accordance with various embodiments. This system 800 may be an example of the system 100 of FIG. 1, system 200 of FIG. 2, and/or system 700 of FIG. 7. The base station 105-e may be equipped with antennas 834-a through 834-x, and the mobile device 115-d may be equipped with antennas 852-*a* through 852-*n*. At the base station 105-*e*, a transmitter processor 820 may receive data from a data source.

The transmitter processor 820 may process the data. The transmitter processor 820 may also generate reference symbols, and a cell-specific reference signal. A transmit (TX) MIMO processor 830 may perform spatial processing (e.g., precoding) on data symbols, control symbols, and/or reference symbols, if applicable, and may provide output symbol streams to the transmit modulators 832-*a* through 832-*x*. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink (DL) signal. In one example, DL signals from modulators 832-*a* through 832-*x* may be transmitted via the antennas 834-*a* through 834-*x*, respectively. The transmitter processor 820 may receive information from a processor 840. The processor 840 may be configured to avoid inter-RAT channel reselection and/or redirection and/or suppress inter-RAT channel measurements based on inter-RAT channel avoidance information as described above. In some embodiments, the processor 840 may be implemented as part of a general processor, the transmitter processor 820, and/or the receiver processor 838. A memory 842 may be coupled with the processor 840.

In some embodiments, the processor 840 is configured to determine inter-RAT channel avoidance information for challenged frequency channels of other RATs. The inter-RAT channel avoidance information may be used suppress inter-RAT channel measurements by mobile device 115-*d*. For example, the processor 840 may modify inter-RAT channel measurement control information transmitted to mobile device 115-*d* to suppress inter-RAT channel measurement based on the inter-RAT channel avoidance information. The processor 840 may be further configured to avoid inter-RAT reselection and/or inter-RAT redirection for mobile device 115-*d* based on the inter-RAT channel avoidance information.

At the mobile device 115-*d*, the mobile device antennas 852-*a* through 852-*n* may receive the DL signals from the base station 105-*e* and may provide the received signals to the demodulators -852*a*Page 28, Line 32 through 854-*n*, respectively. Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854-*a* through 854-*n*, perform MIMO detection on the received symbols if applicable, and provide detected symbols. A receiver processor 858 may process (e.g., demodulate, deinterleave, and decode) the detected symbols, providing decoded data for the mobile device 115-*d* to a data output, and provide decoded control information to a processor 880, or memory 882.

On the uplink (UL), at the mobile device 115-*d*, a transmitter processor 864 may receive and process data from a data source. The transmitter processor 864 may also generate reference symbols for a reference signal. The symbols from the transmitter processor 864 may be precoded by a transmit MIMO processor 866 if applicable, further processed by the demodulators 854-*a* through 854-*n* (e.g., for SC-FDMA, etc.), and be transmitted to the base station 105-*e* in accordance with the transmission parameters received from the base station 105-*e*. At the base station 105-*e*, the UL signals from the mobile device 115-*d* may be received by the antennas 834, processed by the demodulators 832, detected by a MIMO detector 836 if applicable, and further processed by a receive processor. The receiver processor 838 may provide decoded data to a data output and to the processor 880. In some embodiments, the processor 880 may be implemented as part of a general processor, the transmitter processor 864, and/or the receiver processor 858.

In some embodiments, the processor 880 is configured to identify frequencies associated with access failures between the mobile device 115-*d* and another network entity (e.g., base station 105-*e*, etc.) for a first RAT. The processor 880 may be configured to determine channel avoidance information for the first RAT associated with the identified frequency channels. The processor 880 may be configured to determine avoidance information for a second RAT based on the received avoidance information for the first RAT. The processor 880 may be configured to avoid inter-RAT reselection and/or inter-RAT redirection based on the avoidance information for the second RAT. The inter-RAT channel avoidance module 454 may be configured to suppress inter-RAT channel measurements based on the avoidance information for the second RAT.

Figure 9:
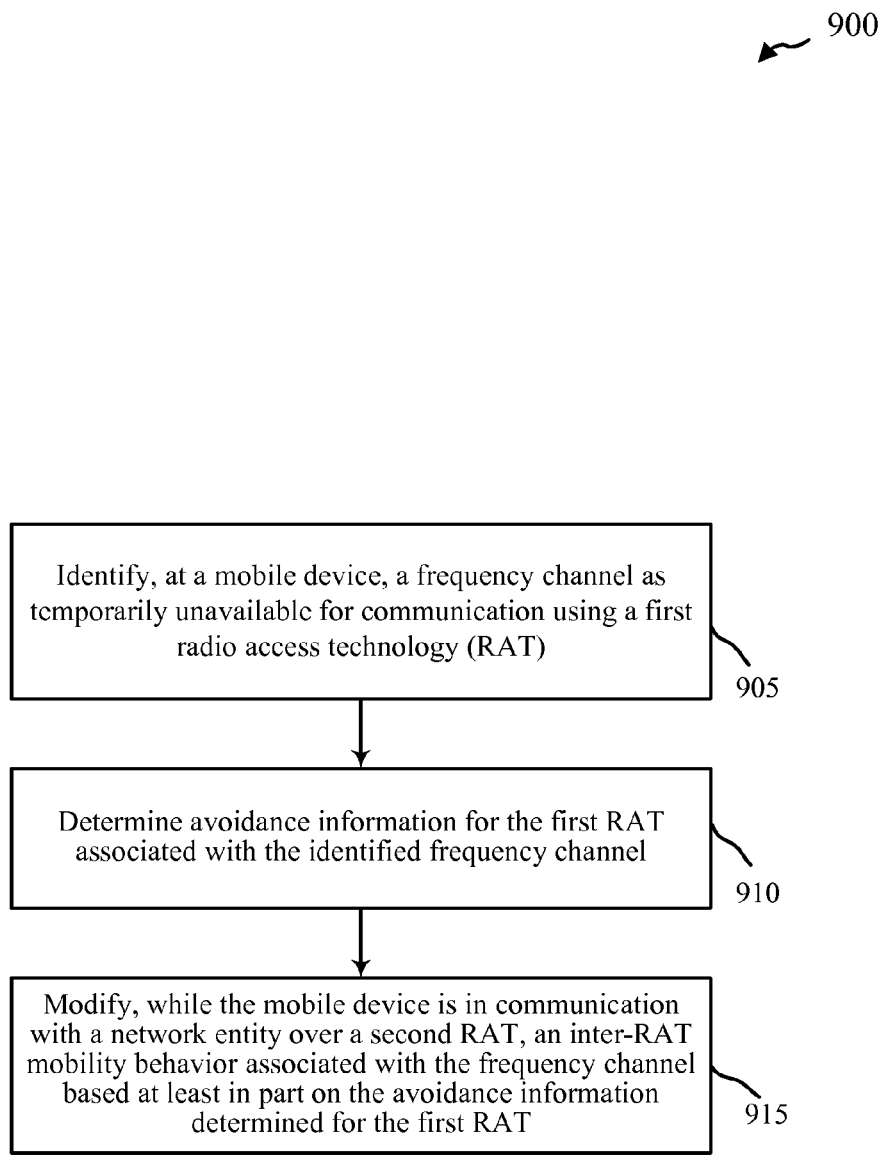
FIG. 9 illustrates a flow diagram of a method for improving inter-RAT mobility performance in a multiple network wireless communications system in accordance with various embodiments.

Turning to FIG. 9, a flow diagram of a method 900 for improving inter-RAT mobility in a multiple network wireless communications system is illustrated in accordance with various embodiments. Method 900 may be implemented utilizing various wireless communications devices including device 400 as illustrated in FIG. 4, and/or mobile devices 115 as illustrated in FIG. 1, FIG. 2, FIG. 3A, FIG. 3B, FIG. 3C, FIG. 5, and/or FIG. 8.

At block 905 of method 900, a device such as mobile device 115 may identify a frequency channel that is temporarily unavailable for communication using a first RAT (e.g., CDMA 1x/DO, etc.). For example, a channel access failure may be identified by the mobile device 115 while attempting to access a first network using the first RAT. The channel access failure may occur as a result of a denied connection on the frequency channel due to network loading, observing a threshold number of traffic channel assignment (TCA) timeouts, network authentication failure, point-to-point protocol failure, session negotiation failure, and/or a maximum access probe failure condition.

At block 910, avoidance information for the first RAT associated with the identified frequency channel is determined. For example, the mobile device may associate a time period for avoidance of the identified frequency channel for the first RAT. At block 915, the mobile device may be communicating with a base station of a second network using a second, different RAT (e.g., LTE/LTE-A, etc.). While communicating (e.g., registered on the second network, etc.) inter-RAT mobility behavior of the second RAT is modified based at least in part on the avoidance information determined for the first RAT. In some embodiments, inter-RAT channel measurement and/or reporting may be suppressed. In some embodiments, inter-RAT reselection and/or inter-RAT redirection may be avoided.

Figure 10:
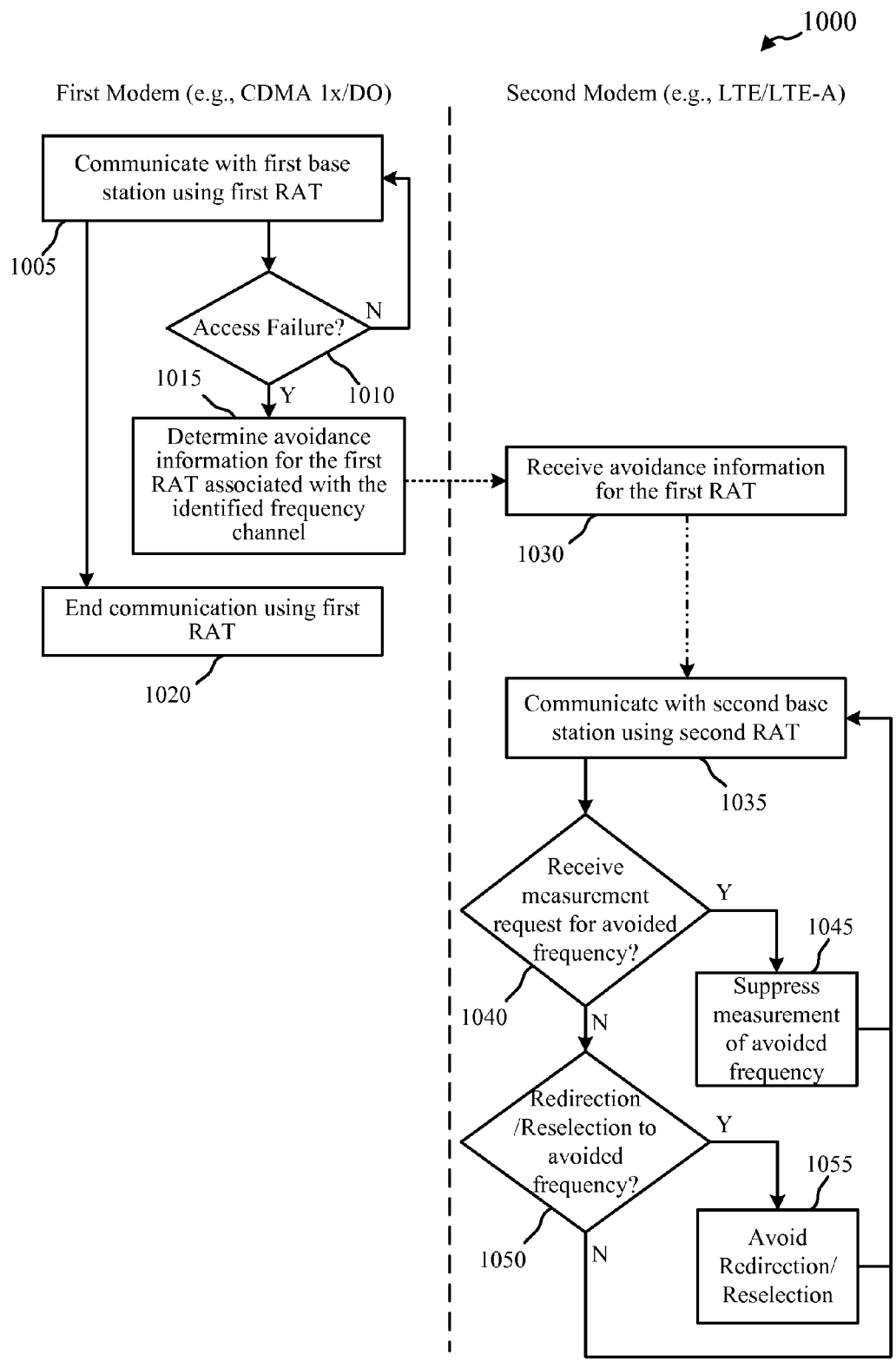
FIG. 10 illustrates a flow diagram of a method for improving inter-RAT mobility performance in a multiple network wireless communications system in accordance with various embodiments.

Turning to FIG. 10, a flow diagram of a method 1000 for improving inter-RAT mobility in a multiple network wireless communications system is illustrated in accordance with various embodiments. Method 1000 may be implemented utilizing various wireless communications devices including device 400 as illustrated in FIG. 4, and/or mobile devices 115 as illustrated in FIG. 1, FIG. 2, FIG. 3A, FIG. 3B, FIG. 3C, FIG. 5, and/or FIG. 8.

At block 1005 of method 1000, the device such as a multimode mobile device 115 may be communicating or attempting to communicate (e.g., via a first modem) with a first base station of a first network using a first RAT. While communicating or attempting to communicate, the device may experience access failures using particular frequencies (e.g., challenged RL frequencies, etc.) at block 1010. The mobile device 115 may determine avoidance information for the first RAT at block 1015. The avoidance information may include a list of avoided frequencies and associated time periods for channel avoidance of these frequencies.

At some point, the mobile device may transition from communicating with (e.g., registered on, etc.) the first network to communicating with a second network using a second RAT. For example, the mobile device 115 may be handed over from the first base station to a second base station that employs the second RAT. Communication using the first RAT may terminate at block 1020 and the mobile device may begin communicating (e.g., register on and/or transmit and receive data, etc.) with the second using the second RAT at block 1035. The avoidance information may be received at block 1030 which may occur before or after communication with the second network begins.

While communicating using the second RAT, the mobile device 115 may avoid and/or suppress inter-RAT mobility behaviors that involve the avoided frequencies for the first RAT. For example, the mobile device 115 may receive a measurement request from the second network at block 1040 that indicates that the mobile device 115 should perform an inter-RAT measurement of the avoided frequency. The mobile device 115 may suppress measurement of the avoided frequency at block 1045. The mobile device may not report channel conditions for the avoided frequency, or may report false (e.g., lower than measured, etc.) channel conditions for the avoided frequency to the second network. Additionally or alternatively, the mobile device 115 may receive a reselection and/or redirection command from the second network to perform an inter-RAT handover to the first network at the avoided frequency at block 1050. The mobile device 115 may avoid the redirection and/or reselection based on the channel avoidance information at block 1055. For example, the mobile device 115 may not acknowledge or may negatively reply to the inter-RAT redirection and/or reselection request from the second network.

Figure 11:
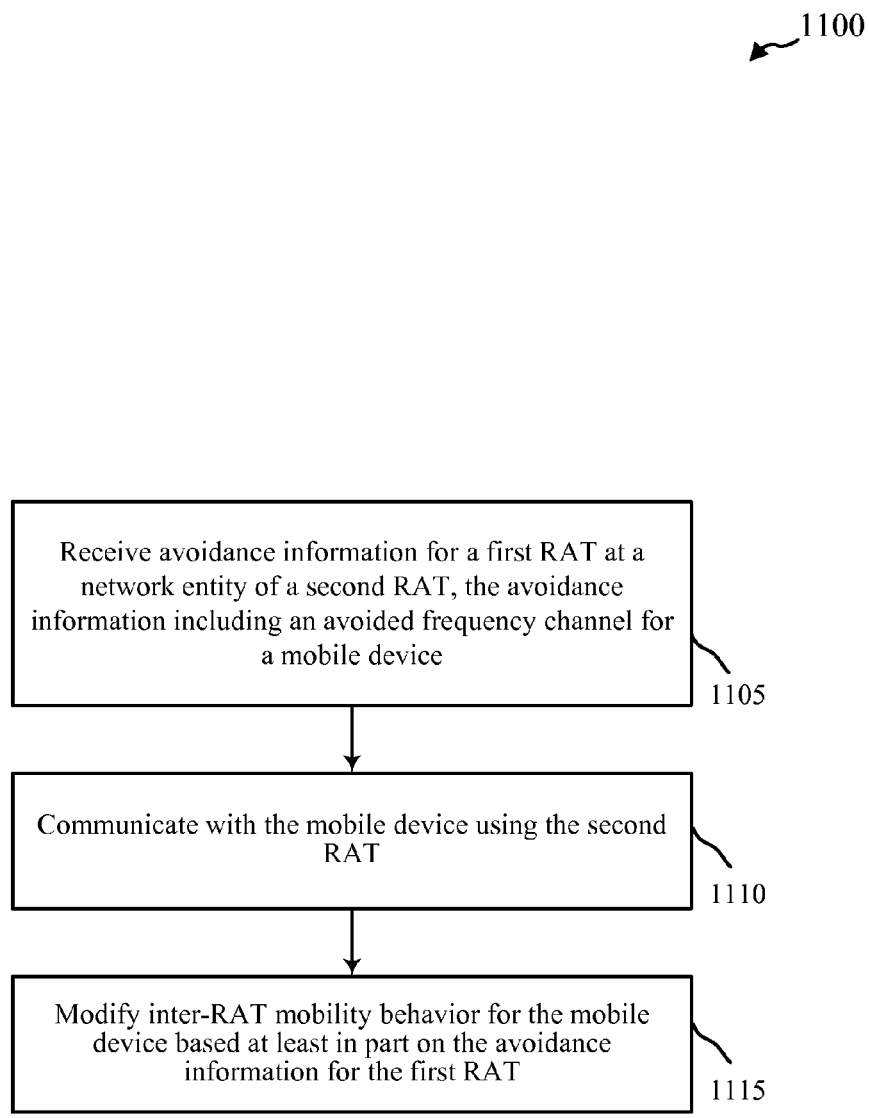
FIG. 11 illustrates a flow diagram of a method for improving inter-RAT mobility performance in a multiple network wireless communications system in accordance with various embodiments.

Turning to FIG. 11, a flow diagram of a method 1100 for improving inter-RAT mobility in a wireless communications system is illustrated in accordance with various embodiments. Method 1100 may be implemented utilizing various wireless communications devices including, but not limited to: device 600 illustrated in FIG. 6 and/or base stations 105 illustrated in FIG. 1, FIG. 2, FIG. 3A, FIG. 3B, FIG. 3C, FIG. 7, and/or FIG. 8.

At block 1105 of method 1100, avoidance information for a first RAT (e.g., CDMA 1x/DO, etc.) may be received at a network entity of a second RAT (e.g., LTE/LTE-A, etc.). The avoidance information may include an avoided frequency channel for a mobile device 115. The avoidance information may be received from, for example, a network entity of the first RAT and/or the mobile device 115.

The network entity of the second RAT may communicate with the mobile device 115 at block 1110. For example, the mobile device 115 may register on the network entity of the second RAT. The network entity of the second RAT may exchange control and/or data communications with the mobile device 115.

At block 1115, the network entity of the second RAT may modify inter-RAT mobility behavior related to the mobile device 115 based on the avoidance information. For example, the avoidance information may include identified frequencies as temporarily unavailable for use by mobile device 115 in communicating using the first RAT. The network entity of the second RAT may, for example, avoid inter-RAT reselection and/or redirection of mobile device 115-*a* to frequencies listed in the avoidance information as temporarily unavailable for communication using the first RAT. Additionally or alternatively, the network entity of the second RAT may suppress inter-RAT measurements for avoided frequencies (e.g., not include avoided frequencies in channel measurement lists sent to the mobile device 115).

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A wireless communications device, comprising:
a first modem supporting wireless communications using a first radio access technology (RAT), the first modem comprising:
an access failure identification module that identifies a frequency channel as temporarily unavailable for communication using the first RAT; and
a channel avoidance module configured to determine avoidance information for the first RAT associated with the identified frequency channel; and
a second modem supporting wireless communication using a second RAT, the second modem comprising:
an inter-RAT channel avoidance module configured to, while the wireless communications device is in communication with a network entity using the second RAT, modify an inter-RAT mobility behavior associated with the frequency channel based at least in part on the avoidance information determined for the first RAT.

2. The wireless communications device of claim 1, wherein the access failure identification module is further configured to:
identify the frequency channel as temporarily unavailable for communication based on an access failure associated with attempted communication between the first modem and a network entity associated with the first RAT over the frequency channel.

3. The wireless communications device of claim 2, wherein the access failure comprises at least one of failure due to network loading, observing a threshold number of traffic channel assignment (TCA) timeouts, network authentication failure, point-to-point protocol failure, session negotiation failure, or a maximum access probe failure condition.

4. The wireless communications device of claim 1, wherein the identified frequency channel comprises a reverse link frequency channel, and wherein the inter-RAT channel avoidance module is further configured to:
suppress reporting of measurement information of an associated forward link frequency channel based at least in part on the avoidance information determined for the first RAT.

5. The wireless communications device of claim 1, wherein the second modem further comprises:
an inter-RAT reselection module configured to avoid inter-RAT reselection to the identified frequency channel based at least in part on the avoidance information determined for the first RAT.

6. The wireless communications device of claim 1, wherein the second modem further comprises:
an inter-RAT redirection module configured to receive inter-RAT redirection requests from the network entity indicating an inter-RAT handover to a network entity associated with the first RAT at the identified frequency channel, and to avoid the inter-RAT handover based at least in part on the avoidance information determined for the first RAT.

7. The wireless communications device of claim 1, wherein,
the channel avoidance module of the first modem is further configured to identify a channel avoidance time period associated with the identified frequency channel for the first RAT, and
wherein the inter-RAT channel avoidance module is further configured to identify an inter-RAT channel avoidance time period associated with the identified frequency channel based at least in part on a remaining time of the channel avoidance time period determined for the first RAT.

8. The wireless communications device of claim 1, wherein the first RAT comprises a CDMA 1x/DO system and the second RAT comprises an Evolved Universal Terrestrial Radio Access Network (E-UTRAN) system.

9. The wireless communications device of claim 1, wherein the inter-RAT channel avoidance module of the second modem is communicatively coupled with the channel avoidance module of the first modem.

10. The wireless communications device of claim 9, wherein a first protocol stack is associated with the first modem and a second protocol stack is associated with the second modem, and wherein the coupling is associated with communication between the first and second protocol stacks.

11. A wireless communications system, comprising:
a channel access failure identification module configured to receive avoidance information for a first radio access technology (RAT) at a network entity of a second RAT, the avoidance information comprising an avoided frequency channel for a mobile device; and
an inter-RAT channel avoidance module configured to, while communicating with the mobile device using the second RAT, modify an inter-RAT mobility behavior for the mobile device based at least in part on the avoidance information for the first RAT.

12. The wireless communications system of claim 11, wherein the inter-RAT channel avoidance module is further configured to:
modify, by the network entity of the second RAT, measurement control information transmitted to the mobile device to suppress channel measurement of the avoided frequency channel by the mobile device based at least in part on the avoidance information determined for the first RAT.

13. A method comprising:
identifying, at mobile device, a frequency channel as temporarily unavailable for communication using a first radio access technology (RAT);
determining avoidance information for the first RAT associated with the identified frequency channel; and
modifying, while the mobile device is in communication with a network entity over a second RAT, an inter-RAT mobility behavior associated with the identified frequency channel based at least in part on the avoidance information determined for the first RAT.

14. The method of claim 13, wherein identifying the frequency channel as temporarily unavailable comprises:
identifying the frequency channel as temporarily unavailable for communication based on an access failure associated with attempted communication between the mobile device and a network entity associated with the first RAT over the frequency channel.

15. The method of claim 14, wherein the access failure comprises at least one of failure due to network loading, observing a threshold number of traffic channel assignment (TCA) timeouts, network authentication failure, point-to-point protocol failure, session negotiation failure, or a maximum access probe failure condition.

16. The method of claim 13, wherein the identified frequency channel comprises a reverse link frequency channel, and wherein modifying the inter-RAT mobility behavior comprises:
suppressing reporting of measurement information of an associated forward link frequency channel based at least in part on the avoidance information determined for the first RAT.

17. The method of claim 13, further comprising:
receiving an inter-RAT redirection request from the network entity indicating an inter-RAT handover between the second RAT and the first RAT at the identified frequency channel; and
avoiding the inter-RAT handover based at least in part on the avoidance information determined for the first RAT.

18. The method of claim 13, further comprising:
identifying conditions for inter-RAT reselection to the first RAT at the identified frequency channel; and
avoiding the inter-RAT reselection based at least in part on the avoidance information determined for the first RAT.

19. The method of claim 13, further comprising:
identifying an inter-RAT channel avoidance time period associated with the identified frequency channel based at least in part on a remaining time of a channel avoidance time period associated with the identified frequency channel for the first RAT.

20. The method of claim 13, wherein the first RAT comprises a CDMA 1x/DO system and the second RAT comprises an Evolved Universal Terrestrial Radio Access Network (E-UTRAN) system.

21. A method, comprising:
receiving avoidance information for a first radio access technology (RAT) at a network entity of a second RAT, the avoidance information comprising an avoided frequency channel for a mobile device;
communicating with the mobile device using the second RAT; and
modifying an inter-RAT mobility behavior for the mobile device based at least in part on the avoidance information for the first RAT.

22. The method of claim 21, wherein the modifying of the inter-RAT mobility behavior comprises:
modifying, by the network entity of the second RAT, measurement control information transmitted to the mobile device to suppress channel measurement of the avoided frequency channel by the mobile device based at least in part on the avoidance information determined for the first RAT.

23. A wireless communications system, comprising:
means for identifying, at a mobile device, a frequency channel as temporarily unavailable for communication using a first radio access technology (RAT);
means for determining avoidance information for the first RAT associated with the identified frequency channel; and
means for modifying, while the mobile device is in communication with a network entity over a second RAT, an inter-RAT mobility behavior associated with the frequency channel based at least in part on the avoidance information determined for the first RAT.

24. The wireless communications system of claim 23, wherein the means for identifying the frequency channel as temporarily unavailable comprises:
means for identifying the frequency channel as temporarily unavailable for communication based on an access failure associated with attempted communication between the mobile device and a network entity associated with the first RAT over the frequency channel.

25. The wireless communications system of claim 24, wherein the access failure comprises at least one of being denied a connection due to network loading, observing a threshold number of traffic channel assignment (TCA) timeouts, network authentication failure, point-to-point protocol failure, session negotiation failure, or a maximum access probe failure condition.

26. The wireless communications system of claim 23, wherein the identified frequency channel comprises a reverse link frequency channel of a traffic channel, and wherein the means for modifying the inter-RAT mobility behavior comprises:
means for suppressing reporting of measurement information of a forward link frequency channel of the traffic channel based at least in part on the avoidance information determined for the first RAT.

27. The wireless communications system of claim 23, further comprising:
means for receiving an inter-RAT redirection request from the network entity indicating an inter-RAT handover between the second RAT and the first RAT at the identified frequency channel; and
means for avoiding the inter-RAT handover based at least in part on the avoidance information determined for the first RAT.

28. The wireless communications system of claim 23, further comprising:
means for identifying conditions for inter-RAT reselection to the first RAT at the identified frequency channel; and
means for avoiding the inter-RAT reselection based at least in part on the avoidance information determined for the first RAT.

29. The wireless communications system of claim 23, further comprising:
means for identifying an inter-RAT channel avoidance time period associated with the identified frequency channel based at least in part on a remaining time of a channel avoidance time period associated with the identified frequency channel for the first RAT.

30. The wireless communications system of claim 23, wherein the first RAT comprises a CDMA 1x/DO system and the second RAT comprises an Evolved Universal Terrestrial Radio Access Network (E-UTRAN) system.

31. A wireless communications system, comprising:
   means for receiving avoidance information for a first radio access technology (RAT) at a network entity of a second RAT, the avoidance information comprising an avoided frequency channel for a mobile device;
   means for communicating with the mobile device using the second RAT; and
   means for modifying an inter-RAT mobility behavior for the mobile device based at least in part on the avoidance information for the first RAT.

32. The wireless communications system of claim 31, wherein the means for modifying the inter-RAT mobility behavior comprises:
   means for modifying, by the network entity of the second RAT, measurement control information transmitted to the mobile device to suppress channel measurement of the avoided frequency channel by the mobile device based at least in part on the avoidance information determined for the first RAT.

33. A computer program product for a wireless communications system comprising:
   a non-transitory computer-readable medium comprising:
   code for causing a computer to identify, at a mobile device, a frequency channel as temporarily unavailable for communication using a first radio access technology (RAT);
   code for causing the computer to determine avoidance information for the first RAT associated with the identified frequency channel; and
   code for causing the computer to modify, while the mobile device is in communication with a network entity over a second RAT, an inter-RAT mobility behavior associated with the frequency channel based at least in part on the avoidance information determined for the first RAT.

34. The computer program product of claim 33, wherein the non-transitory computer-readable medium further comprises:
   code for causing the computer to identify the frequency channel as temporarily unavailable for communication based on an access failure associated with attempted communication between the mobile device and a network entity associated with the first RAT over the frequency channel.

35. The computer program product of claim 34, wherein the access failure comprises at least one of being denied a connection due to network loading, observing a threshold number of traffic channel assignment (TCA) timeouts, network authentication failure, point-to-point protocol failure, session negotiation failure, or a maximum access probe failure condition.

36. The computer program product of claim 33, wherein the identified frequency channel comprises a reverse link frequency channel of a traffic channel, and wherein the non-transitory computer-readable medium further comprises:
   code for causing the computer to suppress reporting of measurement information of a forward link frequency channel of the traffic channel based at least in part on the avoidance information determined for the first RAT.

37. The computer program product of claim 33, wherein the non-transitory computer-readable medium further comprises:
   code for causing the computer to avoid inter-RAT reselection to the identified frequency channel based at least in part on the avoidance information determined for the first RAT.

38. The computer program product of claim 33, wherein the non-transitory computer-readable medium further comprises:
   code for causing the computer to receive inter-RAT redirection requests from the network entity indicating an inter-RAT handover to the first RAT at the identified frequency channel; and
   code for causing the computer to avoid the inter-RAT handover based at least in part on the avoidance information determined for the first RAT.

39. The computer program product of claim 33, wherein the non-transitory computer-readable medium further comprises:
   code for causing the computer to identify an inter-RAT channel avoidance time period associated with the identified frequency channel based at least in part on a remaining time of a channel avoidance time period associated with the identified frequency channel for the first RAT.

40. A computer program product for a wireless communications system comprising:
   a non-transitory computer-readable medium comprising:
   code for causing a computer to receive avoidance information for a first radio access technology (RAT) at a network entity of a second RAT, the avoidance information comprising an avoided frequency channel for a mobile device;
   code for causing the computer to communicate with the mobile device using the second RAT; and
   code for causing the computer to modify an inter-RAT mobility behavior for the mobile device based at least in part on the avoidance information for the first RAT.

41. The computer program product of claim 40, wherein the non-transitory computer-readable medium further comprises:
   code for causing the computer to modify, by the network entity of the second RAT, measurement control information transmitted to the mobile device to suppress channel measurement of the avoided frequency channel by the mobile device based at least in part on the avoidance information determined for the first RAT.

42. A wireless communications device configured for multi-mode access in a multiple network wireless communications system, the wireless communications device comprising:
   at least one processor configured to:
   identify, at a mobile device, a frequency channel as temporarily unavailable for communication using a first radio access technology (RAT);
   determine avoidance information for the first RAT associated with the identified frequency channel; and
   modify, while the mobile device is in communication with a network entity over a second RAT, an inter-RAT mobility behavior associated with the frequency channel based at least in part on the avoidance information determined for the first RAT; and
   a memory coupled to the at least one processor.

43. The wireless communications device of claim 42, wherein the at least one processor is further configured to:
   identify the frequency channel as temporarily unavailable for communication based on an access failure associated with attempted communication between the mobile device and a network entity associated with the first RAT over the frequency channel.

44. The wireless communications device of claim 43, wherein the access failure comprises at least one of being denied a connection due to network loading, observing a threshold number of traffic channel assignment (TCA) timeouts, network authentication failure, point-to-point protocol failure, session negotiation failure, or a maximum access probe failure condition.

45. The wireless communications device of claim 42, wherein the identified frequency channel comprises a reverse link frequency channel of a traffic channel, and wherein the at least one processor is further configured to:
    suppress reporting of measurement information of a forward link frequency channel of the traffic channel based at least in part on the avoidance information determined for the first RAT.

46. The wireless communications device of claim 42, wherein the at least one processor is further configured to:
    receive an inter-RAT redirection request from the network entity indicating an inter-RAT handover between the second RAT and the first RAT at the identified frequency channel; and
    avoid the inter-RAT handover based at least in part on the avoidance information determined for the first RAT.

47. The wireless communications device of claim 42, wherein the at least one processor is further configured to:
    identify conditions for inter-RAT reselection to the first RAT at the identified frequency channel; and
    avoid the inter-RAT reselection to the first RAT at the identified frequency channel based at least in part on the avoidance information determined for the first RAT.

48. The wireless communications device of claim 42, wherein the at least one processor is further configured to:
    identify an inter-RAT channel avoidance time period associated with the identified frequency channel based at least in part on a remaining time of a channel avoidance time period associated with the identified frequency channel for the first RAT.

49. A wireless communications system, the wireless communications system comprising:
    at least one processor configured to:
    receive avoidance information for a first radio access technology (RAT) at a network entity of a second RAT, the avoidance information comprising an avoided frequency channel for a mobile device;
    communicate with the mobile device using the second RAT; and
    modify an inter-RAT mobility behavior for the mobile device based at least in part on the avoidance information for the first RAT; and
    a memory coupled to the at least one processor.

50. The wireless communications system of claim 49, wherein the at least one processor is further configured to:
    modify, by the network entity of the second RAT, measurement control information transmitted to the mobile device to suppress channel measurement of the avoided frequency channel by the mobile device based at least in part on the avoidance information determined for the first RAT.

* * * * *